United States Patent
Jiang et al.

(10) Patent No.: US 9,891,790 B2
(45) Date of Patent: Feb. 13, 2018

(54) SYSTEMS AND METHODS FOR WEB-BASED PRODUCT/CONTENT FUSION MANAGEMENT FUNCTIONS AND USER INTERACTION THEREWITH

(71) Applicant: Hubin Jiang, Reston, VA (US)

(72) Inventors: Hubin Jiang, Reston, VA (US); Rui Min, Sterling, VA (US); Robert A. Kohute, Leesburg, VA (US)

(73) Assignee: Hubin Jiang, Reston, VA (US)

( * ) Notice: Subject to any disclaimer, the term of this patent is extended or adjusted under 35 U.S.C. 154(b) by 0 days.

(21) Appl. No.: 14/688,952

(22) Filed: Apr. 16, 2015

(65) Prior Publication Data
US 2015/0220225 A1    Aug. 6, 2015

Related U.S. Application Data

(63) Continuation-in-part of application No. 13/842,794, filed on Mar. 15, 2013.
(Continued)

(51) Int. Cl.
*G06Q 30/00*     (2012.01)
*G06F 3/0482*    (2013.01)
(Continued)

(52) U.S. Cl.
CPC ........ *G06F 3/0482* (2013.01); *G06F 3/04842* (2013.01); *G06F 3/04855* (2013.01);
(Continued)

(58) Field of Classification Search
CPC .................................................. G06F 3/0482
See application file for complete search history.

(56) References Cited

U.S. PATENT DOCUMENTS 5,576,951 A    11/1996  Lockwood et al.
5,999,190 A *  12/1999  Sheasby .................. G06T 11/00
                                                        345/589
(Continued)

FOREIGN PATENT DOCUMENTS

CA    2896163 A    12/2013
CN    1882999 A    12/2006
(Continued)

OTHER PUBLICATIONS

"Rellik66", Transparency in MS Paint, 3D Realms Forum Archive, Oct. 16, 2006, on line at forums.3drealms.com/vb/showthread.php?t=23012.*
(Continued)

*Primary Examiner* — Bennett M Sigmond
*Assistant Examiner* — Scott C Anderson
(74) *Attorney, Agent, or Firm* — Roberts Mlotkowski Safran Cole & Calderon, P.C.

(57) ABSTRACT

A new system includes one or more computing devices having one or more processors and configured to execute modules. The modules include a content display module configured to respond to user requests to a remote network server by transmitting and displaying on a computing device content comprising text and/or graphics having content portions associated with products, and to transmit and display visual representations of the products in close proximity to the associated content portions, a transparency module, a mouse hover module, a shopping module, a product toggle module, a product list module, a fusion marking module, a fusion edit module, a product addition module, a new product registration module, a fusion deletion module, an unfusion module configured to remove the association between the product and/or service associated with a
(Continued)

selected unfusion selector and the content portion associated with the fusion edit selector, and a fusion listing module.

20 Claims, 30 Drawing Sheets

Related U.S. Application Data

(60) Provisional application No. 61/655,816, filed on Jun. 5, 2012.

(51) Int. Cl.
| | |
|---|---|
| *G06F 3/0485* | (2013.01) |
| *G06F 3/0484* | (2013.01) |
| *H04L 29/08* | (2006.01) |
| *G06F 17/30* | (2006.01) |
| *G06Q 30/06* | (2012.01) |
| *G06Q 30/02* | (2012.01) |

(52) U.S. Cl.
CPC ..... *G06F 17/3089* (2013.01); *G06Q 30/0276* (2013.01); *G06Q 30/0633* (2013.01); *G06Q 30/0641* (2013.01); *H04L 67/02* (2013.01)

(56) References Cited

U.S. PATENT DOCUMENTS

| | | | |
|---|---|---|---|
| 6,408,281 B1 | 6/2002 | Shell et al. | |
| 6,633,889 B2 | 10/2003 | Dessloch et al. | |
| 7,047,253 B1 | 5/2006 | Murthy et al. | |
| 7,559,014 B2* | 7/2009 | Naito | G06T 1/60 |
| | | | 715/201 |
| 7,908,238 B1 | 3/2011 | Nolet et al. | |
| 2002/0091702 A1 | 7/2002 | Mullins | |
| 2003/0126607 A1* | 7/2003 | Phillips | H04N 5/44543 |
| | | | 725/55 |
| 2005/0060324 A1* | 3/2005 | Johnson | G06Q 30/06 |
| 2005/0160014 A1 | 7/2005 | Moss et al. | |
| 2005/0177584 A1 | 8/2005 | Naito et al. | |
| 2006/0015416 A1 | 1/2006 | Hoffman et al. | |
| 2006/0085275 A1 | 4/2006 | Stokes et al. | |
| 2007/0050305 A1 | 3/2007 | Klein | |
| 2009/0076926 A1* | 3/2009 | Zinberg | G06Q 30/08 |
| | | | 705/26.1 |
| 2009/0198577 A1 | 8/2009 | Foreman et al. | |
| 2010/0284389 A1 | 11/2010 | Ramsay et al. | |
| 2011/0258046 A1 | 10/2011 | Ramer et al. | |
| 2012/0010995 A1* | 1/2012 | Skirpa | G06F 3/0481 |
| | | | 705/14.49 |
| 2012/0109789 A1 | 5/2012 | Bhatt et al. | |
| 2012/0259882 A1 | 10/2012 | Thakur et al. | |
| 2013/0073473 A1 | 3/2013 | Heath | |
| 2013/0085812 A1 | 4/2013 | Sharpe et al. | |
| 2013/0132292 A1 | 5/2013 | Lamb et al. | |
| 2013/0325637 A1 | 12/2013 | Jiang | |

FOREIGN PATENT DOCUMENTS

| | | |
|---|---|---|
| CN | 101828167 A | 9/2010 |
| CN | 102360480 A | 2/2012 |
| CN | 102456340 A | 5/2012 |
| CN | 104380329 A | 2/2015 |
| EP | 2856330 A2 | 4/2015 |
| JP | 2001283055 A | 10/2001 |
| JP | 2004164051 A | 6/2004 |
| JP | 2005196469 A | 7/2005 |
| JP | 2006260164 A | 9/2006 |
| JP | 2007505422 A | 3/2007 |
| JP | 2015516122 A | 6/2015 |
| WO | 2013184683 A2 | 12/2013 |

OTHER PUBLICATIONS

Communication pursuant to Article 94(3) EPC; EP Application No. 13 730 728.6-1958; dated Jul. 7, 2017.

Wikipedia: "Computer—Wikipedia, the free encyclopedia", Nov. 2, 2001 (Nov. 2, 2001), pp. 1-7, XP055227910, Retrieved from the Internet: URL:https://en.wikipedia.org/w/index.php?title=Computer&oldid=241445.

* cited by examiner

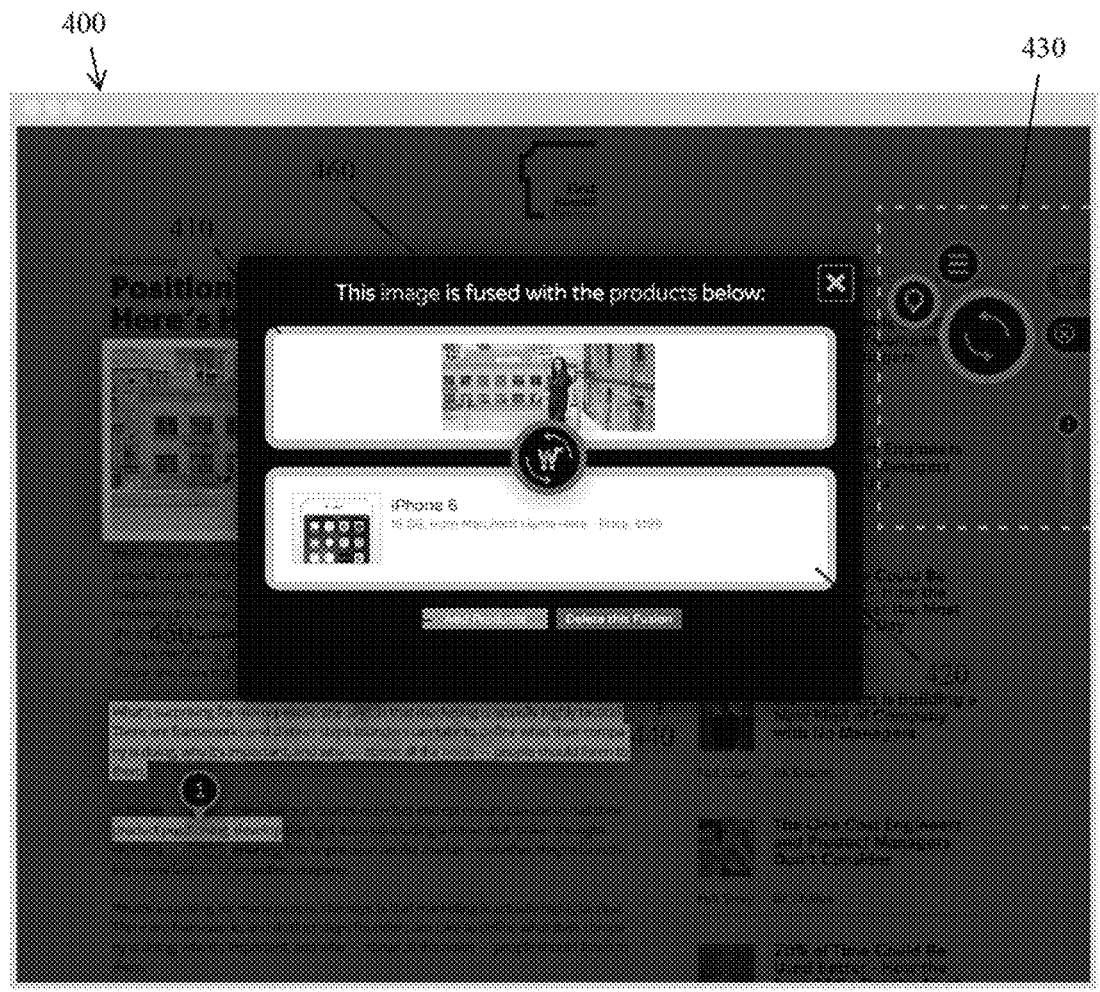
FIG. 4A
FIG. 4B
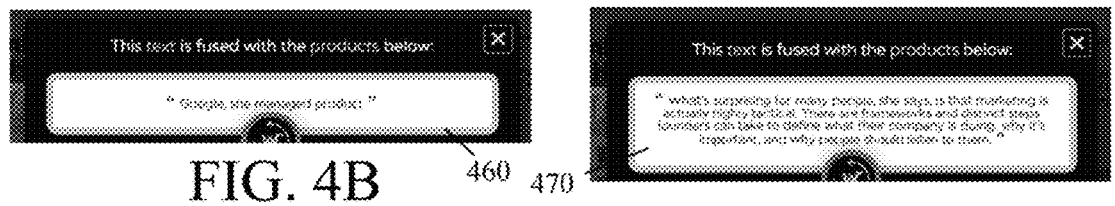
FIG. 4C
FIG. 4D

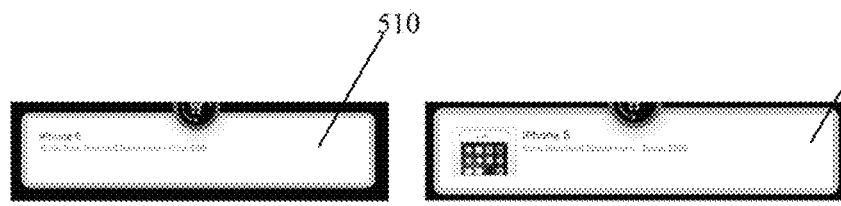
FIG. 5A FIG. 5B
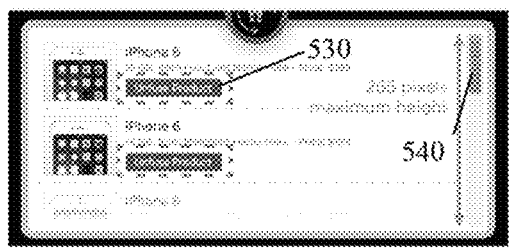 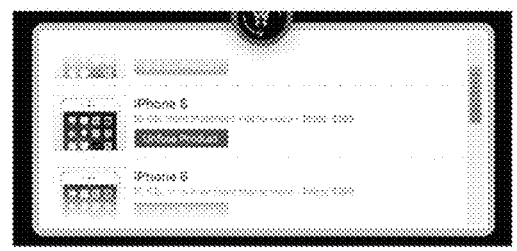
FIG. 5C FIG. 5D
FIG. 5E
FIG. 5F

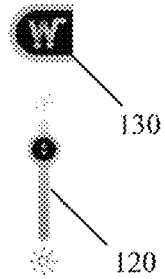 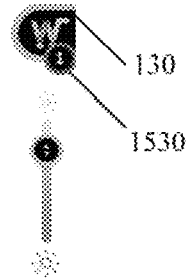 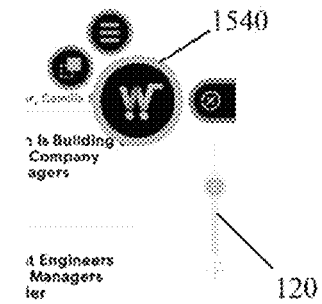 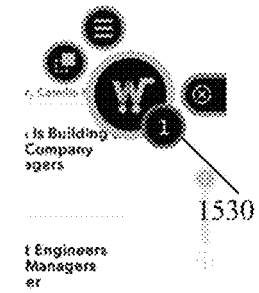
FIG. 15A  FIG. 15B  FIG. 15C  FIG. 15D
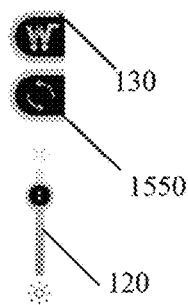 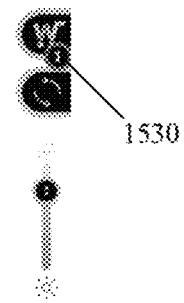 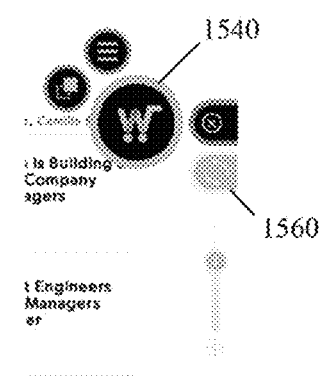 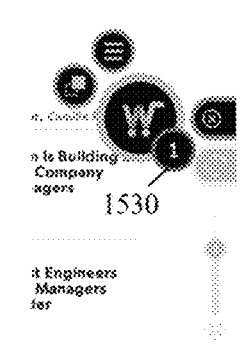
FIG. 15E  FIG. 15F  FIG. 15G  FIG. 15H

SYSTEMS AND METHODS FOR WEB-BASED PRODUCT/CONTENT FUSION MANAGEMENT FUNCTIONS AND USER INTERACTION THEREWITH This application is a continuation-in-part of U.S. patent application Ser. No. 13/842,794, filed Mar. 15, 2013, which is a continuation of PCT/US13/44119 filed Jun. 4, 2013, which claims priority to U.S. Provisional Application No. 61/655,816 filed Jun. 5, 2012, all of which are hereby incorporated by reference in their entirety.

BACKGROUND

The present invention relates generally to graphics-mediated computing device/human interfaces, and more particularly to user interfaces for web-based content manipulation applications. Needs exist for improved systems and methods for user-management of advanced interactive web-based content.

SUMMARY

It is to be understood that both the following summary and the detailed description are exemplary and explanatory and are intended to provide further explanation of the invention as claimed. Neither the summary nor the description that follows is intended to define or limit the scope of the invention to the particular features mentioned in the summary or in the description. Rather, the scope of the invention is defined by the appended claims.

In certain embodiments, the disclosed embodiments may include one or more of the features described herein.

A new system includes one or more computing devices comprising one or more processors and configured to execute modules.

The modules may include a content display module configured to respond to a user request to a remote network server by transmitting over a computer network and displaying on a computing device display content comprising at least one of text and graphics, where the content comprises one or more content portions each associated with one or more products and/or services, the one or more content portions including a first content portion and the one or more products and/or services including a first product or service associated with the first content portion, and to transmit over a computer network and display on a computing device display visual representations of the one or more products and/or services in close proximity to the associated content portions, including displaying a first visual representation of the first product or service in close proximity to the first content portion.

The modules may include a transparency module configured to display on the computing device display a transparency selector and to increase or decrease the transparency of the displayed visual representations responsive to user manipulation of the transparency selector via the user input.

The modules may include a mouse hover module configured to display the first visual representation without transparency along with additional information relating to the first product or service and to highlight the first content portion, responsive to user interaction with the first visual representation and/or first content portion via the user input device and reduce visibility of content outside of the first visual representation and highlighted first content portion.

The modules may include a shopping module configured to respond to user selection of an Add to Cart selector by placing information relating to one of the products or services in the user's virtual shopping cart;

The modules may include a product toggle module configured to display a product toggle selector and to respond to user manipulation of the product toggle selector via the user input device by highlighting the content portions and displaying the visual representations without transparency along with additional information relating to the associated products and/or services such that they do not overlap or obscure the content portions, including displaying a set of more than one of the associated products and/or services associated with a single one of the content portions in overlapping fashion, such that at least a first of the visual representations of the set of products and/or services is partially obscured by at least a second of the visual representations of the set of products and/or services and responding to a user interacting with one of the at least a first of the visual representations of the set of products and/or services by changing the displayed visual representations by displaying the visual representations of the set of products and/or services in overlapping fashion, such that the at least a second of the visual representations of the set of products and/or services is partially obscured by the one of the at least a first of the visual representations of the set of products and/or services, so that the one of the at least a first of the visual representations of the set of products and/or services is fully visible.

The modules may include a product list module configured to display a product list selector and to respond to user manipulation of the product list selector via the user input device by displaying over the content a list of the one or more products and/or services, a product and/or service selector configured to select one of the products and/or services on the list, and a visual representation of the selected product and/or service along with an Add to Cart selector in a central location on the computing device display, along with visual representations of previous and/or next products and/or services in non-central locations on the list, and to respond to changes in the selected products and/or services by changing the display of visual representations accordingly, and to obscure all of the content.

The modules may include a fusion marking module configured to display a fusion marking selector and to respond to selection of the fusion marking selector by obscuring all content other than the content portions and displaying fusion edit selectors, each associated with one of the content portions.

The modules may include a fusion edit module configured to respond to selection of one of the fusion edit selectors by displaying a graphic overlaid on the content and comprising the content portion associated with the selected fusion edit selector, the visual representations of the one or more products and/or services associated with the content portion associated with the fusion edit selector, a product addition selector, a fusion deletion selector, and product unfusion selectors associated with each of the one or more products and/or services associated with the content portion associated with the fusion edit selector.

The modules may include a product addition module configured to associate additional products and/or services with the content portion associated with the fusion edit selector, responsive to user selection of the product addition selector via the input device, wherein associating additional products and/or services comprises displaying a search field and search selector and a new product registration selector, searching products and/or services stored on the remote network server for keywords entered in the search field responsive to user selection of the search selector via the input device, and displaying a list of the results with a selector corresponding to each of the listed results and a fusion continuation selector and, responsive to user selection of the selector corresponding to one of the listed results and of the fusion continuation selector, associating the corresponding one of the listed results with the content portion associated with the fusion edit selector and displaying a visual representation of the corresponding one of the listed results in close proximity to the associated content portion.

The modules may include a new product registration module configured to display input fields for a user to enter information regarding a product and/or service for storage on the remote network server, to receive new product information entered by the user in the new product input fields, and to store the new product information on the remote network server for searching and association with content portions.

The modules may include a fusion deletion module configured to remove the association between the one or more products and/or services associated with the content portion associated with the fusion edit selector and the content portion, responsive to user selection via the input device.

The modules may include an unfusion module configured to remove the association between the product and/or service associated with a selected unfusion selector and the content portion associated with the fusion edit selector.

The modules may include a fusion listing module configured to display a fusion listing selector and, responsive to the user selecting the fusion listing selector, display a list of content portions and associated products and/or services and for each content portion on the list to display an associated fusion deletion selector and product addition selector and to display product unfusion selectors associated with each of a plurality of products and/or services associated with at least one of the listed content portions, wherein displaying the list comprises displaying only a portion of the list at any one time and displaying a list scroll bar configured to scroll up and down the list responsive to user manipulation of the list scroll bar via the input device, and fading the top and/or bottom of the portion of the list to indicate that the list extends beyond the displayed portion.

These and further and other objects and features of the invention are apparent in the disclosure, which includes the above and ongoing written specification, with the drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The accompanying drawings, which are incorporated herein and form a part of the specification, illustrate exemplary embodiments and, together with the description, further serve to enable a person skilled in the pertinent art to make and use these embodiments and others that will be apparent to those skilled in the art. The invention will be more particularly described in conjunction with the following drawings wherein:

FIGS. 4A-D are screenshots of a fusion management page created by the system and method of the present invention, in an embodiment, with fusion pop-up displayed.

FIGS. 5A-F are screenshots of a fusion management page created by the system and method of the present invention, in an embodiment, showing details of fusion pop-ups.

FIG. 15A-H are screenshots of shopping widget details created by the system and method of the present invention, in an embodiment.

DETAILED DESCRIPTION

Figure 1:
FIG. 1 is a screenshot of a fusion management page created by the system and method of the present invention, in an embodiment, highlighting a product transparency control.

Systems and methods for web-based product/content fusion management functions and user interaction therewith will now be disclosed in terms of various exemplary embodiments. This specification discloses one or more embodiments that incorporate features of the invention. The embodiment(s) described, and references in the specification to "one embodiment", "an embodiment", "an example embodiment", etc., indicate that the embodiment(s) described may include a particular feature, structure, or characteristic. Such phrases are not necessarily referring to the same embodiment. When a particular feature, structure, or characteristic is described in connection with an embodiment, persons skilled in the art may effect such feature, structure, or characteristic in connection with other embodiments whether or not explicitly described.

Descriptions of well-known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure. Embodiments discussed herein can be implemented in suitable computer-executable instructions that may reside on a computer readable medium (e.g., a hard disk (HD)), hardware circuitry or the like, or any combination.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited to only those elements but may include other elements not expressly listed or inherent to such process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such non-limiting examples and illustrations includes, but is not limited to: "for example," "for instance," "e.g.," "in one embodiment."

Embodiments of the present invention can be implemented in a computer communicatively coupled to a network (for example, the Internet, an intranet, an internet, a WAN, a LAN, a SAN, etc.), another computer, or in a standalone computer. As is known to those skilled in the art, the computer can include a central processing unit ("CPU") or processor, at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylist, etc.), or the like. In embodiments of the invention, the computer has access to at least one database over the network.

ROM, RAM, and HD are computer memories for storing computer-executable instructions executable by the CPU or capable of being complied or interpreted to be executable by the CPU. Within this disclosure, the term "computer readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a DASD array, magnetic tape, floppy diskette, optical storage device, or other appropriate computer-readable medium or storage device.

In one exemplary embodiment of the invention, the computer-executable instructions may be lines of C++, Java, JavaScript, HTML, Python, or any other programming or scripting code. Other software/hardware/network architectures may be used. For example, the functions of the present invention may be implemented on one computer or shared among two or more computers. In one embodiment, the functions of the present invention may be distributed in the network. Communications between computers implementing embodiments of the invention can be accomplished using any electronic, optical, radio frequency signals, or other suitable methods and tools of communication in compliance with known network protocols.

Additionally, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

It will be understood for purposes of this disclosure that a module is one or more computer processes, computing devices or both, configured to perform one or more functions. A module may present one or more interfaces which can be utilized to access these functions. Such interfaces include APIs, web services interfaces presented for a web services, remote procedure calls, remote method invocation, etc. While embodiments are described having certain modules carrying out certain functions, in other embodiments the functions of the various disclosed modules may be arranged differently, in other words some or all of the functions of one disclosed module may be carried out instead by another disclosed module, or by an additional module, and/or one or more modules may be eliminated or incorporated into another module.

In the several figures, like reference numerals may be used for like elements having like functions even in different drawings. The embodiments described, and their detailed construction and elements, are merely provided to assist in a comprehensive understanding of the invention. Thus, it is apparent that the present invention can be carried out in a variety of ways, and does not require any of the specific features described herein. Also, well-known functions or constructions are not described in detail since they would obscure the invention with unnecessary detail. Any signal arrows in the drawings/figures should be considered only as exemplary, and not limiting, unless otherwise specifically noted.

The description is not to be taken in a limiting sense, but is made merely for the purpose of illustrating the general principles of the invention, since the scope of the invention is best defined by the appended claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items. As used herein, the singular forms "a", "an" and "the" are intended to include the plural forms as well, unless the context clearly indicates otherwise.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

In the illustrated embodiments, a number of selectors, buttons, and other user-manipulable displays are shown and described as part of the user interface/experience between users and the described systems. While certain types of manipulable displays may be preferable based on their function and interaction with other displayed items, in other embodiments various known user-manipulated displays may be substituted therefore. For example, where a slide is shown, a dial may be substituted.

FIG. 1 is a screenshot of a fusion management page 100 created by the system and method of the present invention, in an embodiment, highlighting a product transparency control 120. Also shown are fused products displays 110, shopping cart widget 130 and fuser widget 140. This page may be shown to registered website and/or application users who are currently logged in, such that their interactions with the system may be associated with their user account and tracked. If a user clicks the fuser widget, the fuser widget opens as shown in FIG. 2, enabling fusion functions and displaying additional management functions if the user has fused products on the page.

Figure 2:
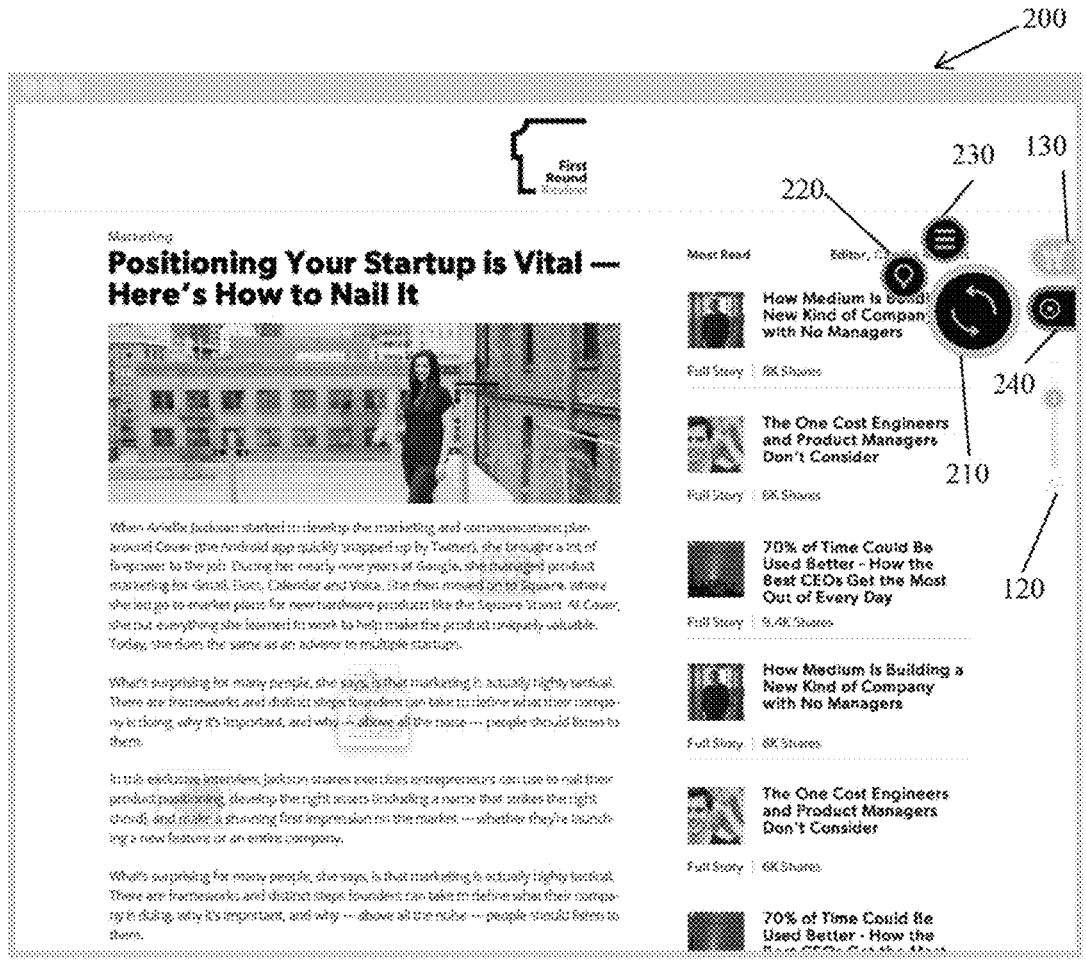
FIG. 2 is a screenshot of a fusion management page created by the system and method of the present invention, in an embodiment, with fuser widget open.
Figure 3:
FIG. 3 is a screenshot of a fusion management page created by the system and method of the present invention, in an embodiment, with fusions markers active.
Figure 8A:
FIGS. 8A-B are screenshots of a fusion management page created by the system and method of the present invention, in an embodiment, with fusion list active.
Figure 8B:
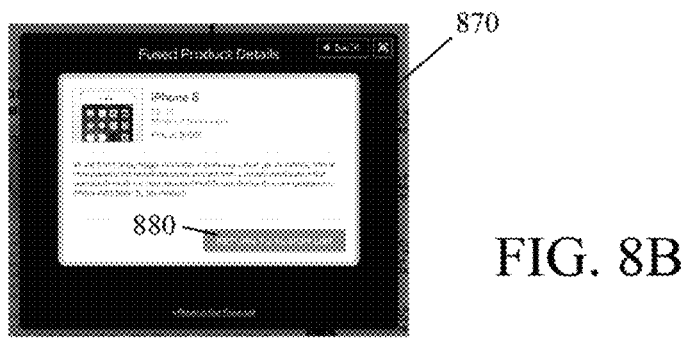

FIG. 2 is a screenshot of a fusion management page 200 created by the system and method of the present invention, in an embodiment, with fuser widget 210 open. Clicking the mark all fusions function 220 highlights all fusions on the page as shown in FIG. 3. Clicking the function 220 again leaves the highlighted fusion view (it functions as a toggle). Clicking list all fusions function 230 launches the fusion List overlay as shown in FIGS. 8A-8B. Shopping cart widget 130 is inactive while the mark fusions function is active. Clicking the close function 240 closes the mark all fusions view and closes the fusion widget. Product transparency control 120 is inactive while the mark fusions function is active. Fuser functionality is active while the fuser widget is open, so that a user can select text/image content to fuse products.

FIG. 3 is a screenshot of a fusion management page 300 created by the system and method of the present invention, in an embodiment, with fusions markers 340 active. All fused images 310 and text 320 are highlighted and fusion markers 340 are displayed with the number of products fused to this image/text. Clicking the fusion marker 340 or the image/text 310/320 launches a fusion details overlay (FIGS. 4A-D). The fusion markers are positioned to the center horizontally, and the point of the markers are aligned roughly 10 pixels above the center of the image/text vertically. In other embodiments, the positioning may differ. In such other embodiments fusion marker positioning may be consistent across content portions or may differ based on such factors as the size of the content portions, proximity of other content portions, perceived importance based on number of associated fusions, etc. Clicking the list all fusions function 230 launches a Fusion List overlay and closes the mark all fusions view. Fuser functionality is not active while the Mark All Fusions function is active as shown, so a user cannot select text/images to fuse products.

FIGS. 4A-D are screenshots of a fusion management page 400 created by the system and method of the present invention, in an embodiment, with fusion pop-up 460 displayed. The text or image 410 for the fusion is displayed in the fusion pop-up 460. Depending on the amount of text, the height of the blue box is flexible. The size of the image 410 shown is scaled down to 100 px in height while keeping the image aspect ratio intact. In other embodiments, different dimensions may be used depending on the application, which is true of other dimensions mentioned with respect to other figures as well. When the fusion details overlay 460 is displayed, the fusion widget controls 430 are not active. The user must close the fusion details overlay to make them active again. Product information 420 and Delete this Fusion button 440 are described in more detail in FIGS. 5A-5F, while Add Products button 450 is described with regard to FIGS. 6A-6C.

FIGS. 4B and 4C show the size of the blue box varying to adjust for the amount of fused text, with box 460 having less text smaller than box 470 with more text. FIG. 4D shows that image 480 is scaled down to 100 pixels.

FIGS. 5A-F are screenshots showing details of fusion pop-ups on a fusion management page 400 created by the system and method of the present invention, in an embodiment. Available product information is displayed in product information box 510 and 520 as shown in FIGS. 5A and 5B, such as product thumbnail, name, attribute, merchant and price. If there is no attribute or thumbnail it is not displayed. Thus, FIG. 5A shows a product information box with no thumbnail image and FIG. 5B shows a product information box with no product attribute. Depending on the number of products in the fusion, the height of the green box (510, 520) is flexible. If there are three or more products, a scrollbar 540 is displayed to allow for scrolling (scrollable area maximum height of 265 pixels) as shown in FIGS. 5C and 5D. FIG. 5D shows the scroll bar partially scrolled downwards, with a gradient/fade at the top and bottom showing that more content is available above and below. The unfuse product button 530 as shown in FIG. 5C is displayed only when there are two or more products fused, not when only 1 product is fused. When a user clicks the "unfuse product" button 530, it changes to "confirm unfuse" 550 as shown in FIG. 5E. The user clicks the "confirm unfuse" button 550 to unfuse the product. If the delete fusion button 440 is selected, the confirmation text and button 560, 570 shown in FIG. 5F is displayed. If the user clicks "Yes, Confirm Delete" the fusion is deleted and the overlay 460 closes and the fusion and its markers are deleted. Clicking "do not delete" 570 closes the delete message and button 50, 570 and returns to the previous add/delete button state.

Figure 6A:
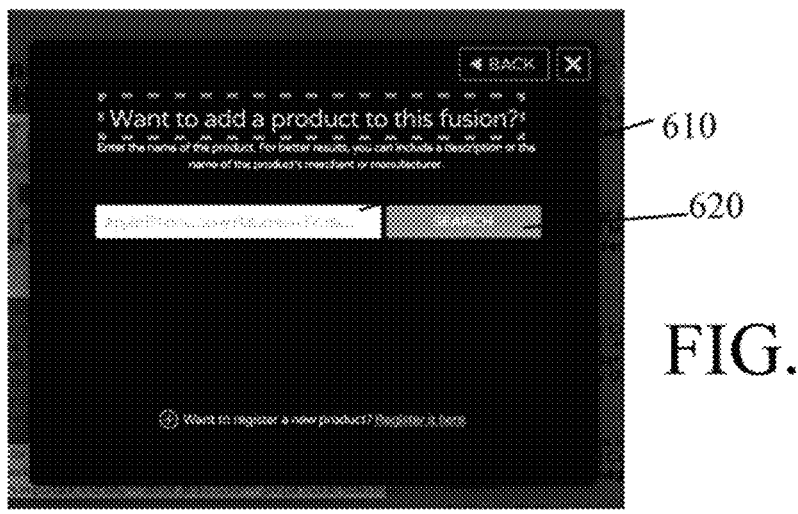
FIGS. 6A-C are screenshots of product addition pop-ups created by the system and method of the present invention, in an embodiment.
Figure 6B:
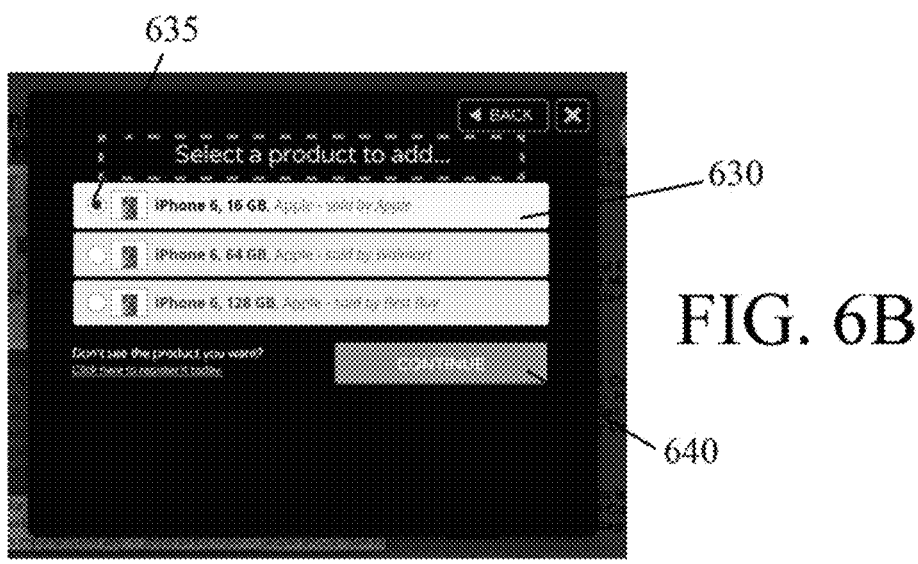
Figure 6C:

FIGS. 6A-C are screenshots of product addition pop-ups created by the system and method of the present invention, in an embodiment, after the Add Products button 450 is selected. First a search button 620 and search field 610 are displayed, allowing a user to enter keywords into the search field 610 to search for relevant products to add to the fusion. Once the search button 620 is selected, products relevant to the keywords entered and found in the remote database are displayed in a list 630 with selectors 635 and continue button 640. Upon choosing to continue, a confirmation button 660 and content/product fusion display 650 are displayed. Selecting the confirmation button 660 leads to the display of FIG. 7.

Figure 7:
FIG. 7 is a screenshot of a product addition pop-up created by the system and method of the present invention, in an embodiment.

FIG. 7 is a screenshot of a product addition pop-up created by the system and method of the present invention, in an embodiment, after selection of the product addition confirmation button 660 in FIG. 6C. Clicking "View updated details" 710 takes the user back to the fusion details overlay for this specific fusion with the new product added. Fuse another product 720 takes a user to the pop-up of FIG. 6A.

FIGS. 8A-B are screenshots of a fusion management page 800 created by the system and method of the present invention, in an embodiment, with fusion list active, for example as a result of selecting the fusion list widget 230 in FIG. 2. Thumbnails of all fused products are displayed at the left 810 of each listed fusion. For all fusions, Add Products button 830 is displayed (described in more detail with reference to FIG. 9B). The unfuse button 840 is also displayed when there are two or more products fused. Clicking on the product thumbnail displays the product details 870 as shown in FIG. 8B. Delete Fusion button 850 is described in more detail in FIG. 9D Clicking "back" or "return to fusion list" buttons 880 return the user to the fusion list details of FIG. 8A. Fuser functionality is not active on fusion management page 800 (user cannot select text/image to fuse products) while the List All Fusions function is active. However fuser widget controls 860 remain open and active except for the shopping cart and product visibility control—both of these are inactive. Clicking the List All Fusions icon again closes the List All overlay and returns to the page 200 shown in FIG. 2. Clicking the Mark All Fusions icon again closes the List All overlay and shows the Mark All fusions highlight state as shown in FIG. 3. Clicking the Fusions icon closes the List All overlay and enables the fuser so users can select text/ images to fuse. Clicking the close icon ("x") closes the List All overlay and closes the fusion widget, returning to screen 100 of FIG. 1.

FIGS. 9A-D are screenshots of fusion list popup details created by the system and method of the present invention, in an embodiment. For a fusion in the fusion list with more than one product and a lot of text (FIG. 9A), all product thumbnails are displayed with an "unfuse" button for each product. All text is displayed and the height of the white box section 900 expands vertically to allow for all text to be displayed.

Figure 9A:
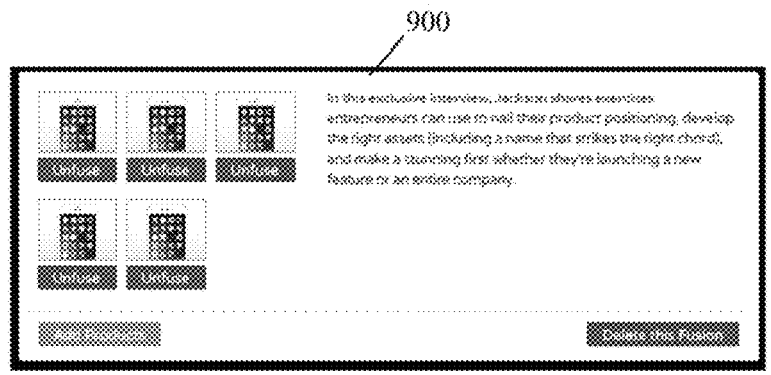
FIGS. 9A-D are screenshots of fusion list popup details created by the system and method of the present invention, in an embodiment.
Figure 9B:
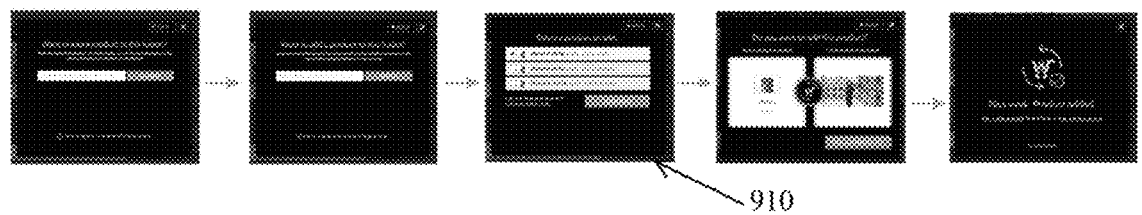

If the user clicks the "add products" button the add product flow 910 of FIG. 9B is followed as described previously with regard to FIGS. 6A-C and 7.

Figure 9C:
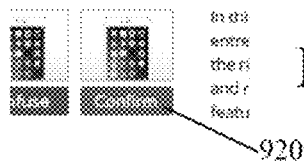

When a user clicks "unfuse" button 840, it changes to "confirm" 920 as shown in FIG. 9C. The user clicks the "confirm unfuse" button 920 to unfuse the product.

Figure 9D:
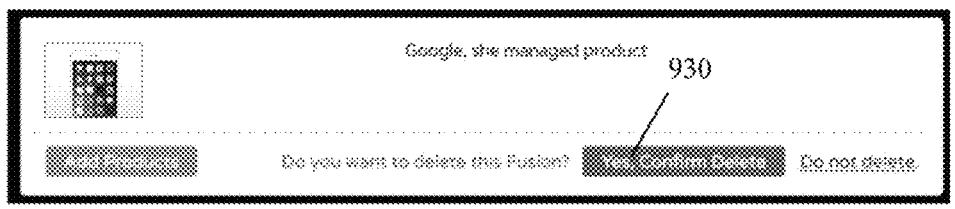

If the user clicks the Delete Fusion button the confirmation text and button 930 of FIG. 9D is displayed. If the user clicks "Yes, Confirm Delete" 930 the fusion is deleted and the overlay closes and the fusion and its markers are deleted. Clicking "do not delete" closes the delete message and button and returns to the previous add/delete button state.

Figure 10A:
FIGS. 10A-B are screenshots of a fusion management page created by the system and method of the present invention, in an embodiment, with fusion list active.
Figure 10B:
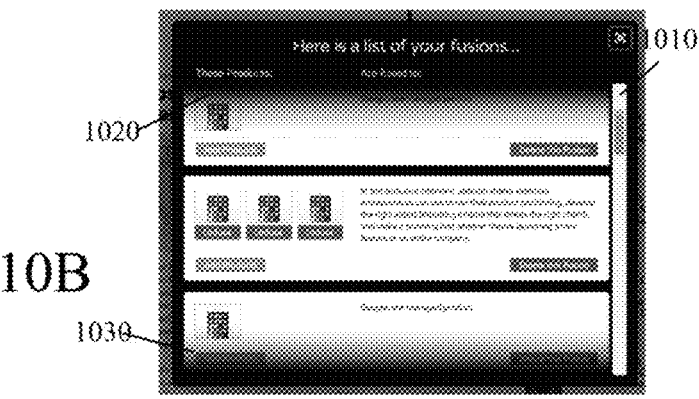

FIGS. 10A-B are screenshots of a fusion management page 1000 created by the system and method of the present invention, in an embodiment, with fusion list active. When there are many fusions to list as shown a scroll bar 1010 is introduced to allow the user to scroll and see all fusions as shown.

When the user scrolls a gradient/fade appears at the top 1020 as well as the bottom 1030 as shown in FIG. 10B.

Figure 11:
FIG. 11 is a screenshot of a guest content page created by the system and method of the present invention, in an embodiment.

FIG. 11 is a screenshot of a guest content page 1100 created by the system and method of the present invention, in an embodiment. The article/webpage content 1110 is one layer of the shopping experience. The transparency of this content layer is affected by certain shopping functions. The content layer is also referred to as the "Foreground".

Figure 12A:
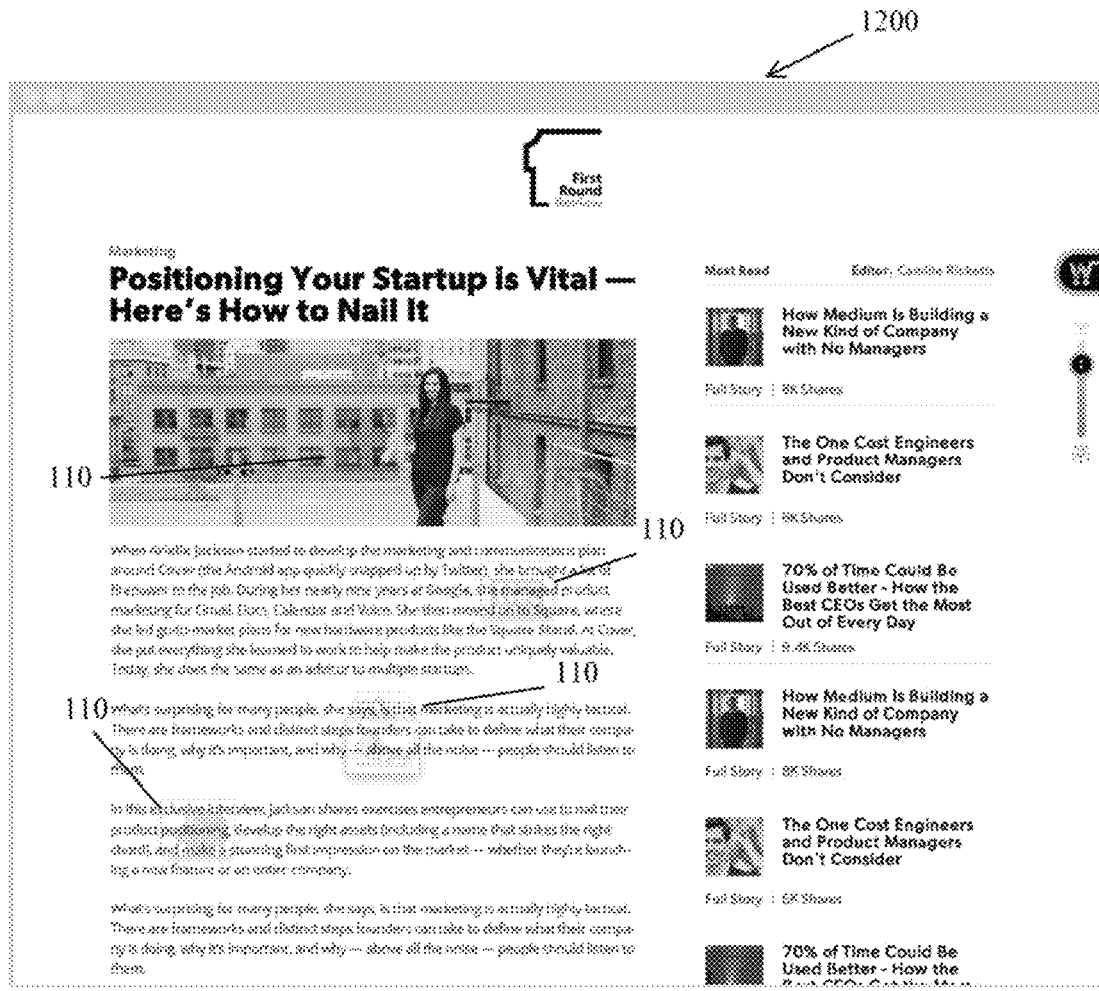
FIGS. 12A-C are screenshots of a guest content page created by the system and method of the present invention, in an embodiment, highlighting fused product displays and mouse hover overlays.
Figure 12B:
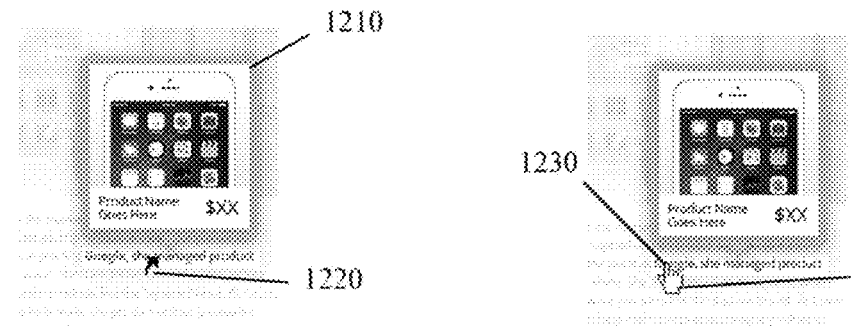
Figure 12C:
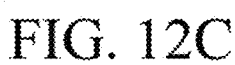

FIGS. 12A-C are screenshots of a guest content page 1200 created by the system and method of the present invention, in an embodiment, highlighting fused product displays and mouse hover overlays. All products 110 associated with all text/image fusions may be displayed according to defined fusion relationship rules as shown in FIG. 12A. The product layer is also referred to as the "Background". When a user hovers over a product thumbnail or fused text or image, a 3D widget/overlay 1210 for viewing products appears as shown in FIG. 12B. A single product is shown in FIG. 12B, multiple products are shown in FIGS. 18A-B and 19A-B. When the user hovers over the thumbnail or text/image, the mouse cursor changes to the "alias" style cursor 1220 (via css for example) as shown in FIG. 12B. Clicking (or otherwise selecting) the thumbnail or text/image launches the product details overlay 870 as shown in FIG. 8B. When there is a text link present in the fused text as shown in FIG. 12C, standard link functions apply. Meaning, the cursor is a standard link cursor and if the user clicks the link it follows the href destination.

Figure 13:
FIG. 13 is a screenshot of a fusion management page created by the system and method of the present invention, in an embodiment, highlighting a product transparency control and fused product displays.

FIG. 13 is a screenshot of a fusion management page 1300 created by the system and method of the present invention, in an embodiment, highlighting a product transparency control 120 and fused product displays 110. Product visibility control 120 is displayed only if there are products fused to the page. The user can click and drag the handle to change the setting, or may click anywhere on the orange bar to jump to that transparency setting. The user can use this control to change the visibility (transparency) of the products (background layer). The default setting for product visibility (transparency) is set to 30%. The user can set the transparency of the background to no lower than 10%, but may make the transparency up to 100%. The very top of the control is 10%, and the very bottom of the control is 100%. FIG. 13 shows the products/background 110 as being set to 100%.

Figure 14A:
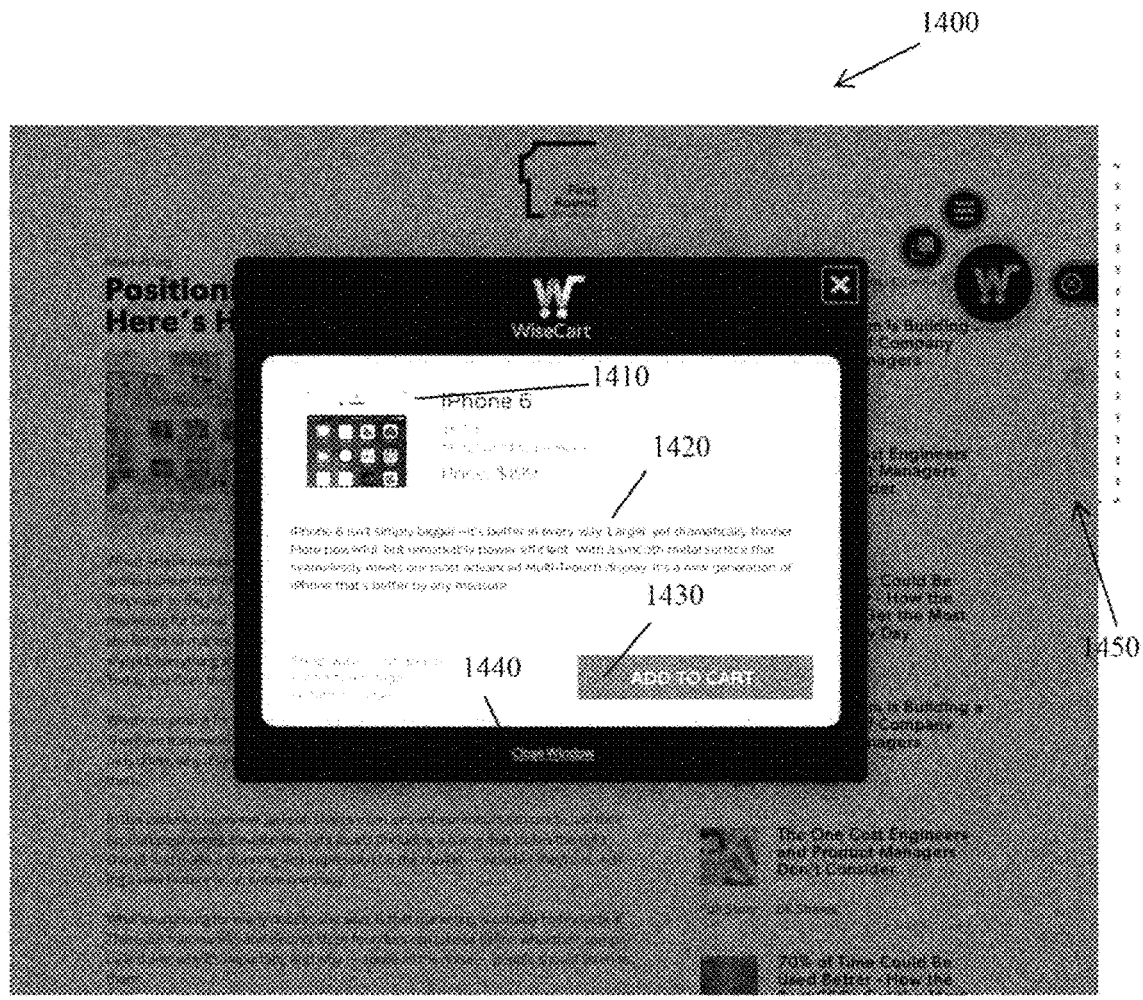
FIGS. 14A-B are screenshots of a fusion shopping page created by the system and method of the present invention, in an embodiment, with product detail pop-up and detail.
Figure 14B:
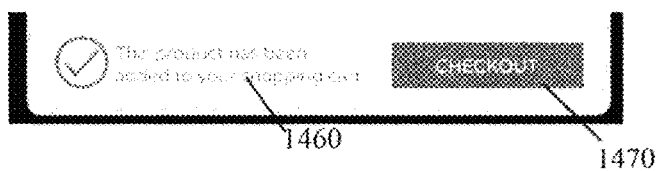

FIGS. 14A-B are screenshots of a fusion shopping page 1400 created by the system and method of the present invention, in an embodiment, with product detail pop-up.

Available product information is displayed in the top position 1410 (product thumbnail, name, attribute, merchant and price). If no attribute or thumbnail is available, it is not displayed. The product description 1420 is positioned below. Clicking the Add to Cart button 1430 adds the product to the user's cart and the button and message to the left is replaced with the text 1460 and Checkout button 470 shown in FIG. 14B. Clicking the checkout button 1470 takes the user to the shopping cart flow. If a product is currently in a user cart, and they view this product details layer for that same product, this section is displayed as shown here to allow the user to checkout and alert them that the product is already in their cart. CLOSE PRODUCT DETAILS—clicking the "x" or close link will close the product details overlay. When the product details overlay is displayed, the shopping widget controls 1450 are not active. The user must close the fusion details overlay to make them active again.

FIGS. 15A-H are screenshots of shopping widget details created by the system and method of the present invention, in an embodiment. FIG. 15A shows a shopping widget for guest users (or logged out users) shopping cart 130 and visibility control 120 with no items in the cart. Note: visibility control only shown when products fused to page. FIG. 15B shows shopping cart 130 and visibility control 120 with items in the cart. Number of items in the cart 1530 is shown. FIG. 15C shows a shopping cart widget 1540 open with no items in the cart. The cart icon 1540 is not clickable when no items are in the cart. Note: the visibility 120 control is disabled when the cart widget is open. FIG. 15D shows a shopping cart widget open with items in the cart. Clicking the cart icon or number icon 1530 will take the user to the shopping cart flow in a new tab. Note: the visibility control is disabled when the cart widget is open. FIG. 15E shows fuser 2550, shopping cart 130 and visibility control 120 with no items in the cart. FIG. 15F shows fuser, shopping cart and visibility control with items in the cart. FIG. 15G shows the shopping cart widget open with no items in the cart. Fuser icon 1560 and the visibility control are disabled when the cart widget 1540 is open. FIG. 15H shows the shopping cart widget open with items in the cart. Fuser icon and the visibility control are disabled when the cart widget is open.

Figure 16:
FIG. 16 is a screenshot of a fusion shopping page created by the system and method of the present invention, in an embodiment, with shopping cart widget open.
Figure 17:
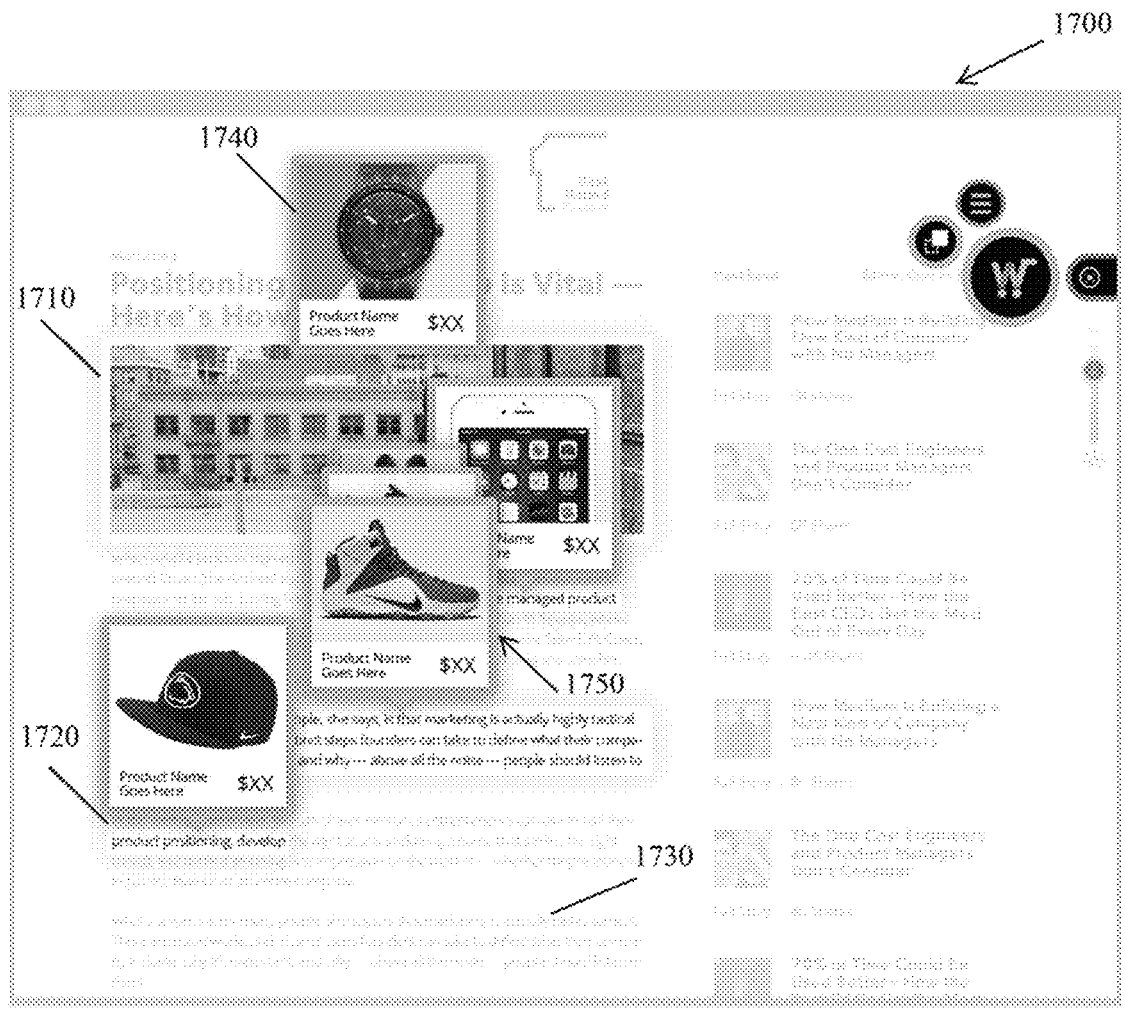
FIG. 17 is a screenshot of a fusion shopping page created by the system and method of the present invention, in an embodiment, with product toggle function active.

FIG. 16 is a screenshot of a fusion shopping page 1600 created by the system and method of the present invention, in an embodiment, with shopping cart widget 1610 open. Shopping cart icon 1610 takes the user to the shopping cart flow. The cart flow opens in a new browser tab and follows all cart flow logic. Product toggle (foreground/background toggle) function 1620 toggles the foreground and background. When clicked, all products fused on the page are displayed associated with their related text/image and the 3D widget fully visible as shown in FIG. 17. If clicked again (when background is visible), it toggles back to hide the background layer. Product list function 1630 opens a full page 3D widget that lists all the products fused with the specific page. Clicking it again hides the full page 3D widget. Close shopping widget 1640 closes the shopping widget 1610. Product visibility control 1650 is inactive while shopping cart widget 1610 is open.

FIG. 17 is a screenshot of a fusion shopping page 1700 created by the system and method of the present invention, in an embodiment, with product toggle function active. All fused images 1710 are highlighted as shown (and the 3D product widget 1740 is displayed in association with the text or image it is fused with according to Fusion Relationship rules. When a single product is fused to one content portion, all fused text is highlighted as shown (and the 3D product widget 1740 is displayed in association with the text or image it is fused with according to Fusion Relationship rules). Clicking the product widget 1740 opens the product details overlay. The foreground layer 1730 becomes transparent as shown when the background layer is active.

Figure 18A:
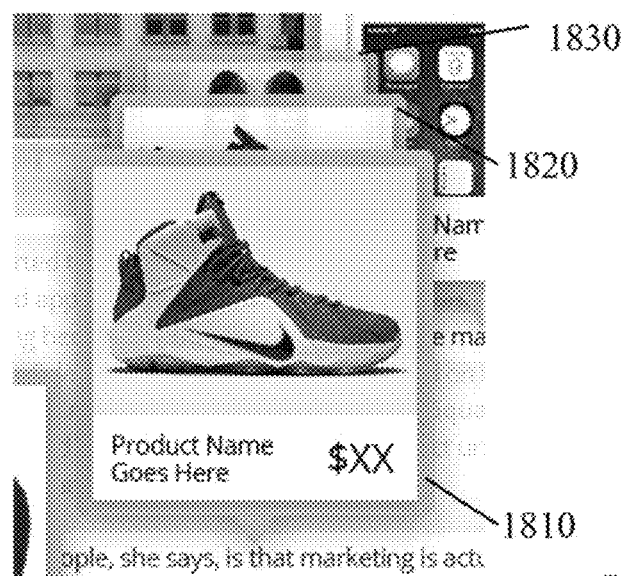
FIGS. 18A-B are detail screenshots of a fusion shopping page created by the system and method of the present invention, in an embodiment, highlighting a product widget with product toggle function active.
Figure 18B:
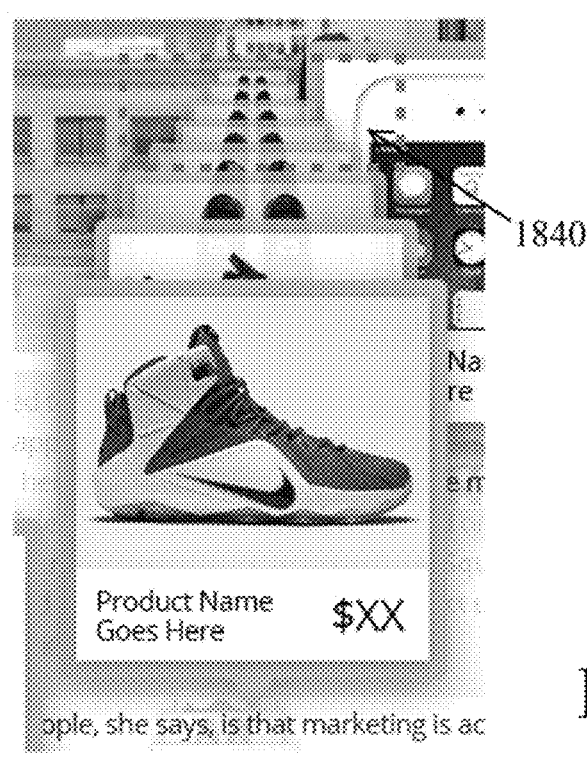

FIGS. 18A-B are detail screenshots of a fusion shopping page 1700 created by the system and method of the present invention, in an embodiment, highlighting a product widget with product toggle function active. For multiple products fused to a single content portion, the 3D shopping widget has more functions than if only one product was fused. The first product is displayed in product position 1810. The most recently fused products are displayed first in the illustrated embodiment, although in other embodiments the order of the fused products may be based on other criteria such as user popularity. Clicking this product thumbnail/details opens the product details overlay. The second product is displayed in position 1820. It has transparency and is displayed in a way that illustrates 3D depth and perspective as shown. Clicking this product thumbnail brings it to the front (position 1810) using animation and transform/scaling effects and send the product that was in position 1810 backward to position 1820, also using animation and transform/scaling effects. The third product is displayed in position 1830. It has more transparency than position 1820 and is displayed in a way that illustrates 3D depth and perspective as shown. Clicking this product thumbnail brings it to the front (position 1810) using animation and transform/scaling effects and moves products in position 1810 and 1820 backward to positions 1820 and 1830, respectively, also using animation and transform/scaling effects. More details about animations and transitions are shown in FIGS. 19A-B.

Additional products 1840 are displayed as shown in FIG. 18B. Each product thumbnail is clickable to bring it to position 1810 and re-order the other products as described above. If there are more than eight products fused, in the illustrated embodiment only eight products are visible at once as shown (although in other embodiments more or less products may be visible at once) but the product order remains and acts as a loop.

Figure 19A:
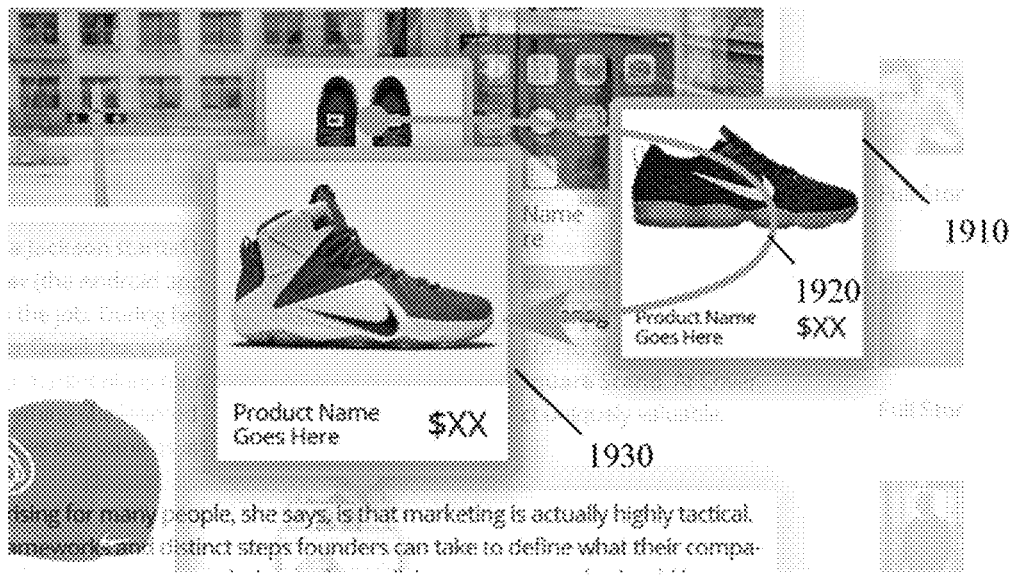
FIGS. 19A-B are screenshot details showing product widget animation and effects created by the system and method of the present invention, in an embodiment.
Figure 19B:
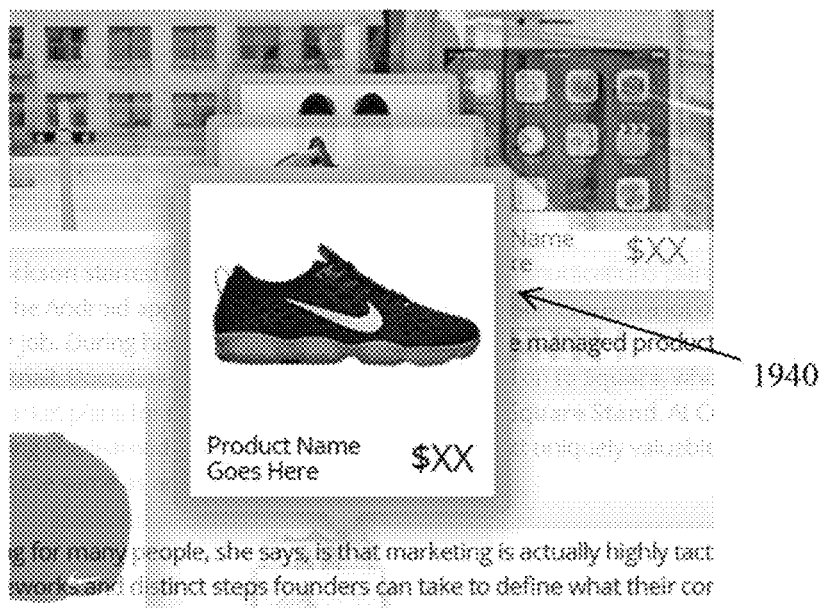

FIGS. 19A-B are screenshot details showing product widget animation and effects created by the system and method of the present invention, in an embodiment. When a user clicks any of the products (not in position 1930), the thumbnail for that product slides out and moves along the path 1920 as shown. While the thumbnails moves along that path, the size changes/transforms smoothly as it travels along the path until it lands in position 1930 (where it has the same size as the position 1930 size when its path stops). This resize and reposition does not happen instantly, rather it is a smooth transition taking one or two seconds. FIG. 19A shows what happens if someone clicks on the product in the second position (1910). This same action and behavior happens for all other product thumbnails (except position 1930 because that launches the product details overlay). At the same time that the thumbnail is traveling along that path 1920, the thumbnail in position 1930, and all other products that were in front of thumbnail 1910, move backwards in a straight path to allow room for the new thumbnail to be in position 1930. When they move backwards the size changes/transforms smoothly as they travel backwards. Once the transition in this example is complete the thumbnails 1940 appear as shown in FIG. 19B. In other embodiments, other animations may be used to change the displayed order of the thumbnails, for example the thumbnail being moved to the front may simply move straight through the other thumbnails on its way to the front. In other embodiments, the thumbnails may be displayed in other ways, rather than as a "stack", for example as a sphere or cube of different thumbnails, which may be rotated to bring other thumbnails to the front.

Figure 20:
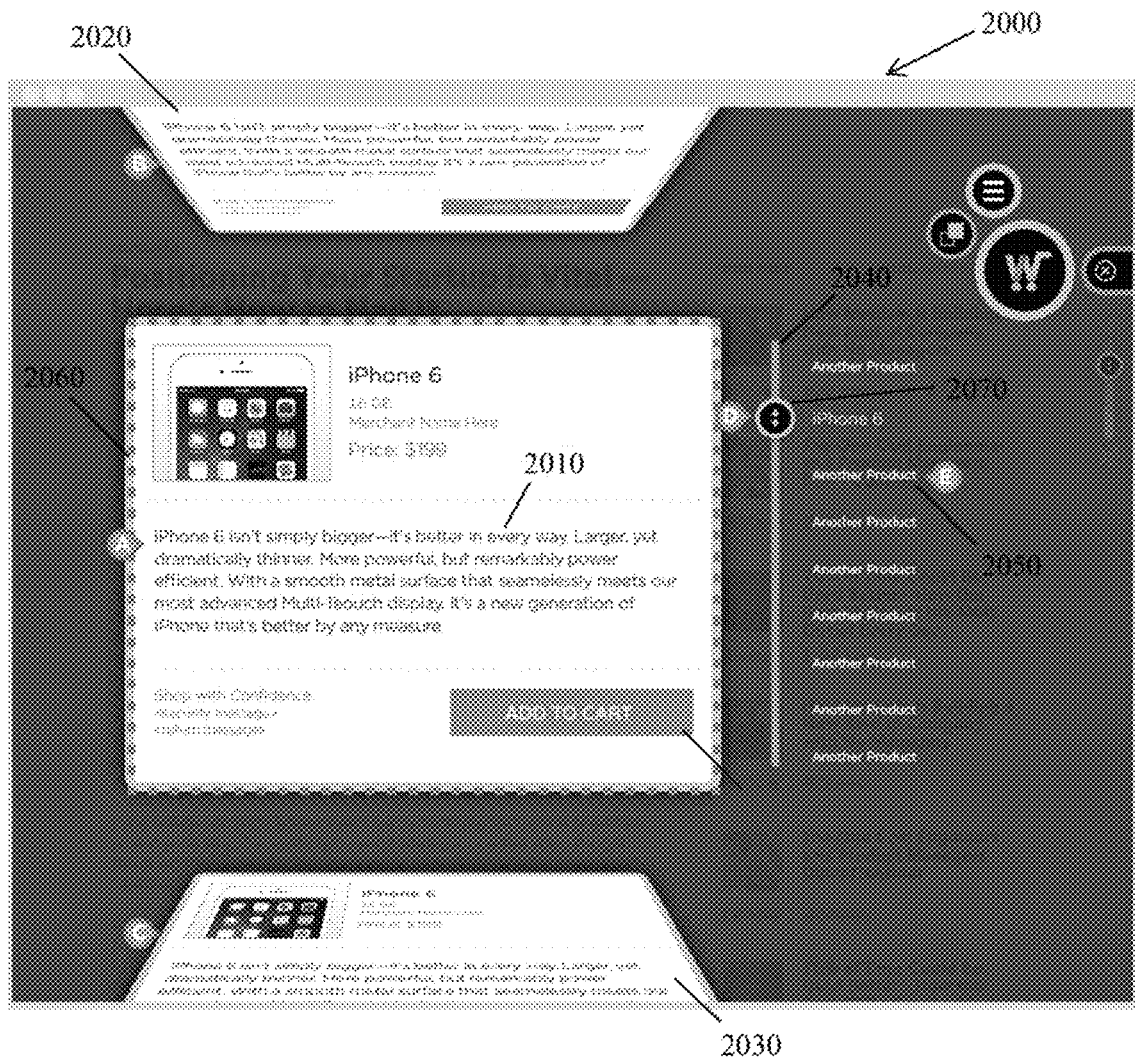
FIG. 20 is a screenshot of a fusion shipping page created by the system and method of the present invention, in an embodiment, with a product list full page 3D widget open.

FIG. 20 is a screenshot of a fusion shopping page 2000 created by the system and method of the present invention, in an embodiment, with a product list full page 3D widget open. Product details overlay displays the first product in position 2060 and displays the product overlay (with the same functions as previously defined). The most recently added products are displayed first. The previous product on the list is displayed in position 2020. Its shape has 3D perspective as shown and when a user clicks it, it moves to the primary position 2060. When moving to position 2060 when clicked, it animates and transform its shape. Once clicked, it also is highlighted in the side navigation 2070. On page load, there is no previous product—meaning this product widget does not operate as a loop, rather as a list. Previous products are only be shown if a user scrolls the products down. The next product is displayed in position 2030. Its shape has 3D perspective as shown and when a user clicks it, it moves to the primary position 2060. When moving to position 2060 when clicked, it animates and transforms its shape. Once clicked, it is also highlighted in the side navigation 2070. Product list navigation bar and handle 2070 allows users to click and drag the handle of this bar to navigate between products. Moving the handle down shows the next products. Moving it up displays previous products. Users can also click on the orange bar on locations adjacent to the product name to jump directly to that product. The product widget animates through all products until the selected product is in position 2060. All product names for the fused products on the page are listed 2050. The product currently in position 2060 is highlighted as shown. All other products are listed as well—and are clickable so the user can click any product name and that product moves to position 2060. If more products are listed (fused) than allow for the space shown (here nine products) then this list functions in tandem with the product list handle and scrolls up to reveal more products as the product list handle is moved down.

Figure 21:
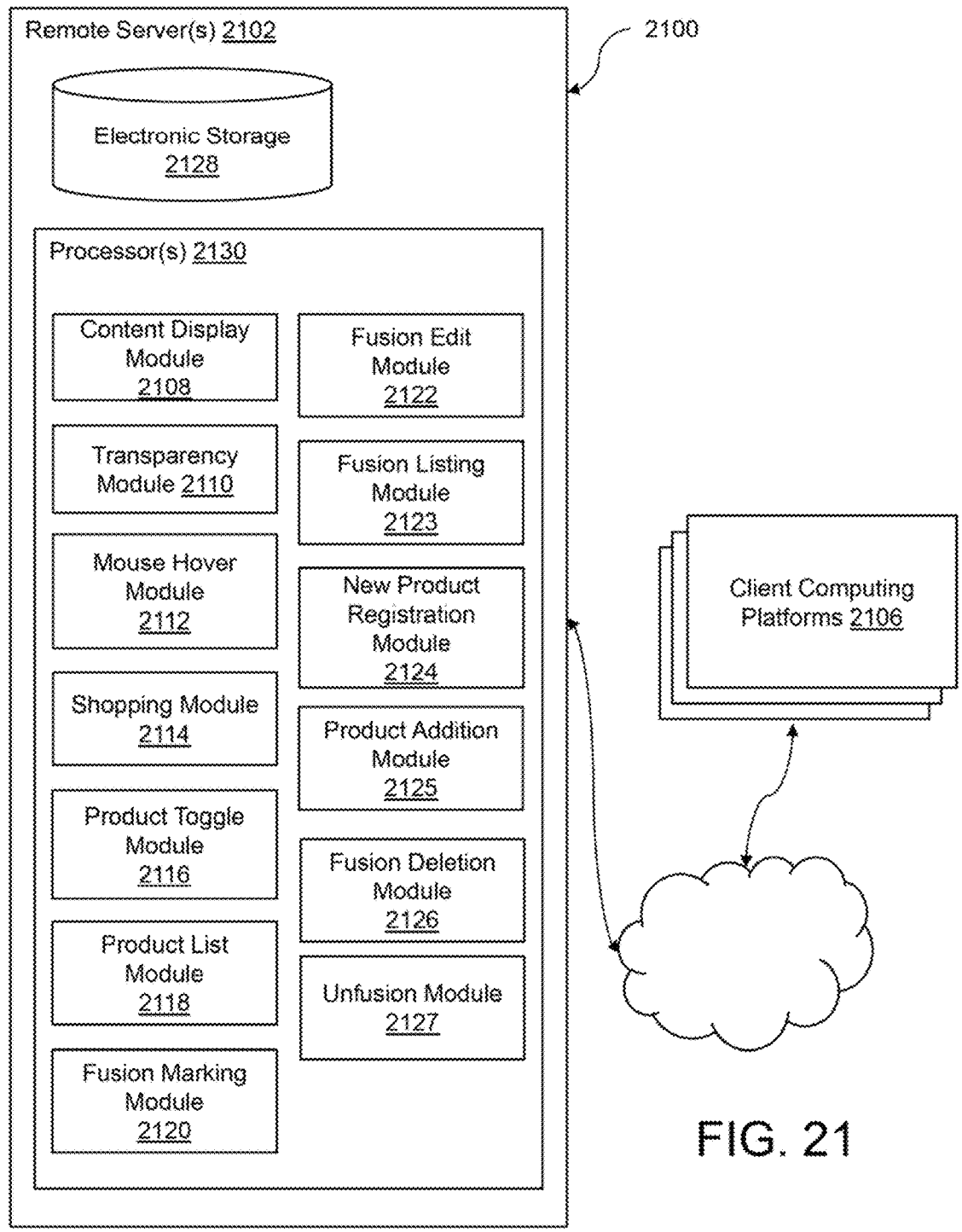
FIG. 21 is a network topology for managing and interacting with content/product fusions, in an embodiment.

FIG. 21 illustrates a system 2100 configured to manage and allow user interaction with product/content fusions, in an embodiment. Managing product/content fusions may include transmitting display information over a network. Remote server(s) 2102 may be configured to communicate with one or more client computing platforms 2106 according to a client/server architecture. Users may access system 2100 via client computing platforms 2106. Remote server(s) 2102 may be a stand-alone system or a part of a larger system such as a website or other channel through which users retrieve content and manage content/product fusions. The Remote server(s) 2102 may store content, product information, and content/product fusions, and respond to user requests to view, manage and interact with the content/product fusions. Remote server(s) 2102 in embodiments may act as an intermediary between advertisers 2130 and one or more external channels, controlling some or all ads displayed over the channels.

System 2100 is only one example of a suitable computing environment and is not intended to suggest any limitation as to the scope of use or functionality of the features described herein. The remote server(s) 2102 are configured to respond to user requests for content and allow for management with and interaction of content/product fusions and to execute one or more computer program modules. In implementations, remote server(s) 2102 may be configured to receive user requests to display content and to manage content/product fusions. The computer program modules may include one or more of a content display module 2108, a transparency module 2110, a mouse hover module 2112, a shopping module 2114, a product toggle module 2116, a product list module 2118, a fusion marking module 2120, a fusion edit module 2122, a fusion listing module 2123, a new product registration module 2124, a product addition module 2125, a fusion deletion module 2126, and/or an unfusion module 2127. As noted, the client computing platform(s) 2106 may include one or more computer program modules that are the same as or similar to the computer program modules of the Remote server(s) 2102 to facilitate providing the interactive advertising to the user.

Content display module 2108 may be configured to respond to a user request to a remote network server by transmitting over a computer network and displaying on a computing device display content comprising at least one of text and graphics. The content may include one or more content portions each associated with one or more products and/or services, the one or more content portions including a first content portion and the one or more products and/or services including a first product or service associated with the first content portion. Content display module 2108 may be configured to transmit over a computer network and display on a computing device visual representations of the one or more products and/or services in close proximity to the associated content portions, including displaying a first visual representation of the first product or service in close proximity to the first content portion. The visual representations of the one or more products and/or services may be displayed overlapping with the associated content portions. The one or more products and/or services may include one or more products, and the visual representations of the one or more products may include pictures of the products. The visual representations of the one or more products and/or services may be displayed overlapping with the associated content portions.

Transparency module 2110 may be configured to display on the computing device display a transparency selector and to increase or decrease the transparency of the displayed visual representations responsive to user manipulation of the transparency selector via the user input. The transparency selector may include a sliding scale with a low transparency indicator on one end, a high transparency indicator on another end, and a current transparency level indicator, and the transparency selector may be configured to reduce transparency of the displayed visual representations when the user adjusts the current transparency level indicator towards the low transparency indicator and to increase transparency of the displayed visual representations when the user adjusts the current transparency level indicator towards the high transparency indicator.

Mouse hover module 2112 may be configured to display the first visual representation without transparency along with additional information relating to the first product or service and to highlight the first content portion, responsive to user interaction with the first visual representation and/or first content portion via the user input device and reduce visibility of content outside of the first visual representation and highlighted first content portion. The user interaction may include positioning a pointer over the first visual representation and/or first content portion. The additional information may include a product name and price. The first visual representation displayed without transparency may be located adjacent to but not overlapping with the first content portion. Mouse hover module 2112 may be further configured to reduce visibility of content outside of the first visual representation without transparency and highlighted first content portion.

Mouse hover module 2112 may be further configured to display an Add to Cart selector associated with the first product or service, wherein the Add to Cart selector is configured to place information relating to the product or service in the user's virtual shopping cart when selected by the user via the input device. The virtual shopping cart may be stored on the remote network server. The Add to Cart selector may be displayed responsive to user selection of the first visual representation without transparency and/or the highlighted first content portion. The Add to Cart selector may be displayed in a pop-up display on top of the content, together with the additional information relating to the first product or service and transaction information, and visibility of content around the borders of the pop-up display may be reduced to focus the user on the pop-up display. The displayed content around the borders of the pop-up display may be made less visible by darkening background around the content and/or lightening the content to reduce contrast.

Shopping module 2114 may be configured to respond to user selection of an Add to Cart selector by placing information relating to one of the products or services in the user's virtual shopping cart.

Product toggle module 2116 may be configured to display a product toggle selector and to respond to user manipulation of the product toggle selector via the user input device by highlighting the content portions and displaying the visual representations without transparency along with additional information relating to the associated products and/or services such that they do not overlap or obscure the content portions, including displaying a set of more than one of the associated products and/or services associated with a single one of the content portions in overlapping fashion, such that at least a first of the visual representations of the set of products and/or services is partially obscured by at least a second of the visual representations of the set of products and/or services. The product toggle module 2116 may be configured to respond to a user interacting with one of the at least a first of the visual representations of the set of products and/or services by changing the displayed visual representations by displaying the visual representations of the set of products and/or services in overlapping fashion, such that the at least a second of the visual representations of the set of products and/or services is partially obscured by the one of the at least a first of the visual representations of the set of products and/or services, so that the one of the at least a first of the visual representations of the set of products and/or services is fully visible.

The second of the visual representations of the set of products and/or services may be larger than the first of the visual representations of the set of products and/or services and only a part of the first of the visual representations of the set of products may be displayed along an edge of the second of the visual representations of the set of products and/or services, creating the appearance that the first of the visual representations of the set of products is some distance behind the second of the visual representations of the set of products and/or services. Responsive to a user interacting with one of the at least a first of the visual representations of the set of products and/or services, the displayed visual representations may be changed by displaying the visual representations of the set of products and/or services in overlapping fashion, such that the at least a second of the visual representations of the set of products and/or services is partially obscured by the one of the at least a first of the visual representations of the set of products and/or services, so that the one of the at least a first of the visual representations of the set of products and/or services is fully visible. Changing the displayed visual representations may include displaying an animation showing the one of the at least a first of the visual representations of the set of products and/or services sliding out from behind the at least a second of the visual representations of the set of products and/or services and sliding back in front of the at least a second of the visual representations of the set of products and/or services as the at least a second of the visual representations of the set of products and/or services moves away from the user.

Product list module 2118 may be configured to display a product list selector and to respond to user manipulation of the product list selector via the user input device by displaying over the content a list of the one or more products and/or services, a product and/or service selector configured to select one of the products and/or services on the list, and a visual representation of the selected product and/or service along with an Add to Cart selector in a central location on the computing device display, along with visual representations of previous and/or next products and/or services in non-central locations on the list, and to respond to changes in the selected products and/or services by changing the display of visual representations accordingly, and to obscure all of the content.

The product and/or service selector may include a slide with a current product indicator next to the list, configured to move the current product indicator along the slide beside the list responsive to user manipulation via the input device, and to select the product and/or service on the list next to a location of the current product indicator as the one of the products and/or services on the list.

The visual representation of the selected product and/or service along with associated information and the Add to Cart selector may be displayed in a first window, and a visual representation of a next product and/or service on the list after the selected product and/or service may be displayed along with associated information and Add to Cart selector in a second window below the first window and angled such that it appears to lie flat and perpendicular to the first window. Responsive to the current product indicator moving along the slide to the next product and/or service on the list after the selected product and/or service, the next product and/or service on the list may be made the selected product and/or service, displaying the first window sliding up and out of the center of the computing device display and tilting into an angle such that it appears to lie flat and perpendicular to a surface of the computing device display, and the second window may be displayed sliding up and into the center of the computing device display and tilting into an angle such that it appears to lie parallel with the surface of the computing device display.

Fusion marking module 2120 may be configured to display a fusion marking selector and to respond to selection of the fusion marking selector by obscuring all content other than the content portions and displaying fusion edit selectors, each associated with one of the content portions. Each of the fusion edit selectors may include an indicator of the number of products and/or services associated with the associated content portion.

Fusion edit module 2122 may be configured to respond to selection of one of the fusion edit selectors by displaying a graphic overlaid on the content and comprising the content portion associated with the selected fusion edit selector, the visual representations of the one or more products and/or services associated with the content portion associated with the fusion edit selector, additional information regarding each of the one or more products and/or services associated with the content portion associated with the fusion edit selector, a product addition selector, a fusion deletion selector, and product unfusion selectors associated with each of the one or more products and/or services associated with the content portion associated with the fusion edit selector.

Fusion listing module 2123 may be configured to display a fusion listing selector and, responsive to the user selecting the fusion listing selector, display a list of content portions and associated products and/or services and for each content portion on the list, to display an associated fusion deletion selector and product addition selector and to display product unfusion selectors associated with each of a plurality of products and/or services associated with at least one of the listed content portions. Only a portion of the list may be displayed at any one time and a list scroll bar configured to scroll up and down the list responsive to user manipulation of the list scroll bar via the input device may be displayed, and the top and/or bottom of the portion of the list may be faded to indicate that the list extends beyond the displayed portion. The list may be displayed overlaying the content, and all content visible outside the list may be obscured. The fusion listing module 2123 may be further configured to respond to user selection of a product or service on the list by displaying more information relating to the selected product or service in a central pop-up window overlaid on other graphics displayed on the computing device display.

New product registration module 2124 may be configured to display input fields for a user to enter information regarding a product and/or service for storage on the remote network server, to receive new product information entered by the user in the new product input fields, and to store the new product information on the remote network server for searching and association with content portions.

Product addition module 2125 may be configured to associate additional products and/or services with the content portion associated with the fusion edit selector, responsive to user selection of the product addition selector via the input device. A search field and search selector and a new product registration selector may be displayed, products and/or services stored on the remote network server may be searched for keywords entered in the search field responsive to user selection of the search selector via the input device, and a list of the results may be displayed with a selector corresponding to each of the listed results and a fusion continuation selector. Responsive to user selection of the selector corresponding to one of the listed results and of the fusion continuation selector, the corresponding one of the listed results may be associated with the content portion associated with the fusion edit selector and a visual representation of the corresponding one of the listed results may be displayed in close proximity to the associated content portion.

Fusion deletion module 2126 may be configured to remove the association between the one or more products and/or services associated with the content portion associated with the fusion edit selector and the content portion, responsive to user selection via the input device.

Unfusion module 2127 may be configured to remove the association between the product and/or service associated with a selected unfusion selector and the content portion associated with the fusion edit selector.

In some implementations, the Remote server(s) 2102 and client computing platforms 2106 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which servers 2102 and client computing platforms 2106 may be operatively linked via some other communication media.

A given client computing platform 2106 may include one or more processors configured to execute computer program modules. The computer program modules may be configured to enable an expert or user associated with the given client computing platform 2106 to interface with system 2100, and/or provide other functionality attributed herein to client computing platforms 2106. By way of non-limiting example, the given client computing platform 2106 may include one or more of a desktop computer, a laptop computer, a handheld computer, a tablet computing platform, a NetBook, a Smartphone, a gaming console, and/or other computing platforms.

Remote server(s) 2102 may include electronic storage 2104, one or more processors 2130, and/or other components. Remote server(s) 2102 may include communication lines, or ports to enable the exchange of information with a network and/or other computing platforms. Illustration of Remote server(s) 2102 in FIG. 21 is not intended to be limiting. Remote server(s) 2102 may include a plurality of hardware, software, and/or firmware components operating together to provide the functionality attributed herein to remote server(s) 2102. For example, Remote server(s) 2102 may be implemented by a cloud of computing platforms operating together as remote server(s) 2102.

Electronic storage 2104 may comprise non-transitory storage media that electronically stores information. The electronic storage media of electronic storage 2104 may include one or both of system storage that is provided integrally (i.e., substantially non-removable) with Remote server(s) 2102 and/or removable storage that is removably connectable to remote server(s) 2102 via, for example, a port (e.g., a USB port, a firewire port, etc.) or a drive (e.g., a disk drive, etc.). Electronic storage 2104 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 2104 may include one or more virtual storage resources (e.g., cloud storage, a virtual private network, and/or other virtual storage resources). Electronic storage 2104 may store software algorithms, information determined by processor 2126, information received from remote server(s) 2102, information received from client computing platforms 2106 and/or advertisement provider(s) 2130, and/or other information that enables Remote server(s) 2102 to function as described herein.

Processor(s) 2126 is configured to provide information processing capabilities in Remote server(s) 2102. As such, processor 2126 may include one or more of a digital processor, an analog processor, a digital circuit designed to process information, an analog circuit designed to process information, a state machine, and/or other mechanisms for electronically processing information. Although processor 2126 is shown in FIG. 21 as a single entity, this is for illustrative purposes only. In some implementations, processor 2126 may include a plurality of processing units. These processing units may be physically located within the same device, or processor 2126 may represent processing functionality of a plurality of devices operating in coordination.

The processor 2126 may be configured to execute modules 2108, 2110, 2112, 2114, 2116, 2118, 2120, 2122, 2123, 2124, 2125, 2126 and 2127. Processor 2126 may be configured to execute modules 2108, 2110, 2112, 2114, 2116, 2118, 2120, 2122, 2123, 2124, 2125, 2126 and 2127 by software; hardware; firmware; some combination of software, hardware, and/or firmware; and/or other mechanisms for configuring processing capabilities on processor 2126. As used herein, the term "module" may refer to any component or set of components that perform the functionality attributed to the module. This may include one or more physical processors during execution of processor readable instructions, the processor readable instructions, circuitry, hardware, storage media, or any other components.

Figure 22:
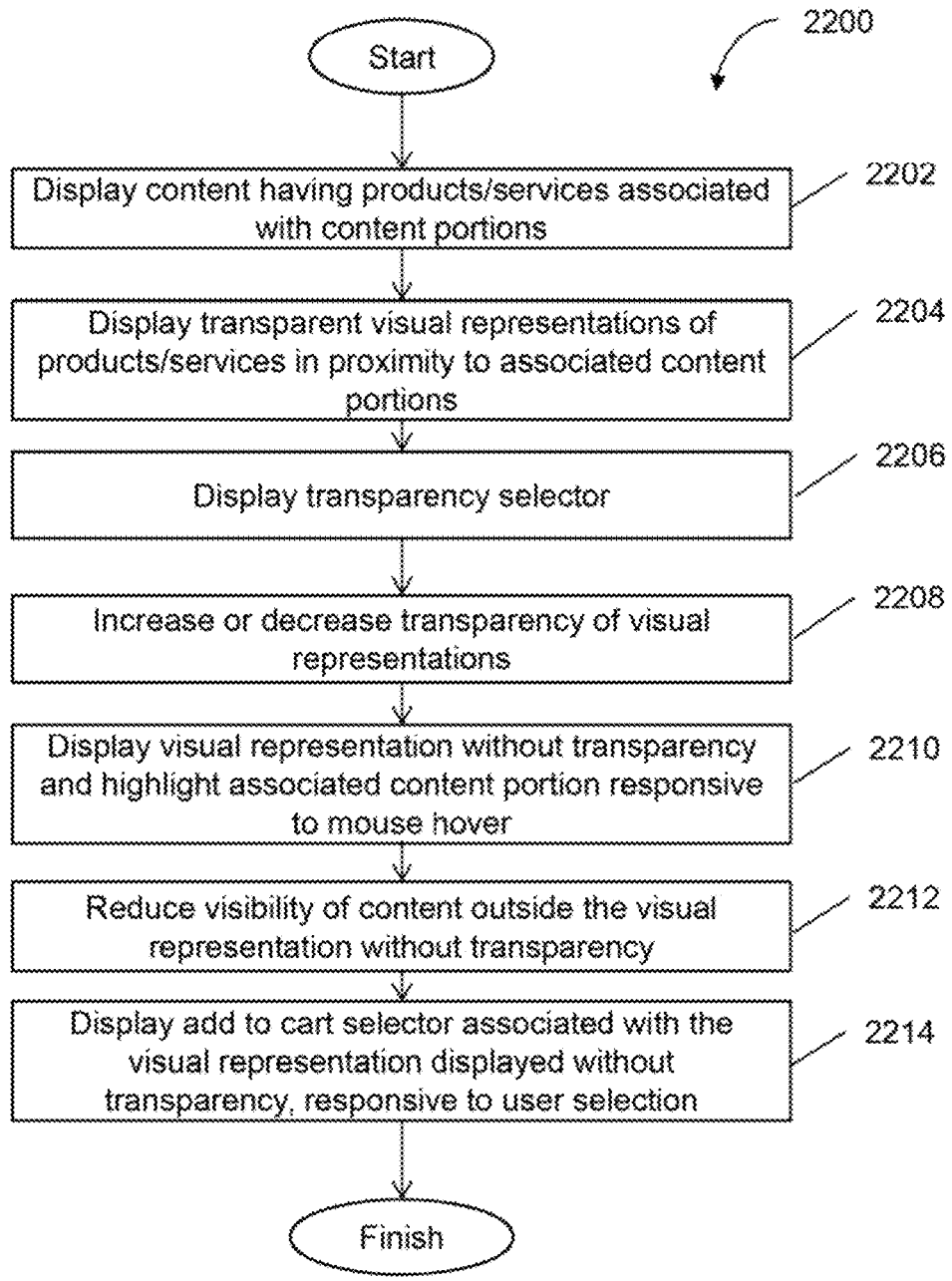
FIG. 22 is a method for managing and interacting with content/product fusions, in an embodiment.

FIG. 22 depicts an embodiment of a method 2200 for managing and interacting with content/product fusions. One skilled in the art will appreciate that the following method is presented as an exemplary non-limiting embodiment, where in other embodiments steps may be performed in various orders, combined, omitted, and/or additional steps may be included.

In some embodiments, method 2200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 2200 in response to instructions stored electronically on an electronic storage medium. The one or more processing devices may include one or more devices configured through hardware, firmware, and/or software to be specifically designed for execution of one or more of the operations of method 2200.

At step 2202, content having products/services associated with content portions may be displayed. Step 2202 may be performed by a content display module that is the same as or similar to content display module 2108, in accordance with one or more implementations.

At step 2204, transparent visual representations of products/services may be displayed in proximity to associated content portions. Step 2204 may be performed by a content display module that is the same as or similar to content display module 2108, in accordance with one or more implementations.

At step 2206, a transparency selector may be displayed. Step 2206 may be performed by a transparency module that is the same as or similar to transparency module 2110, in accordance with one or more implementations.

At step 2208, transparency of visual representations may be increased or decreased. Step 2208 may be performed by a transparency module that is the same as or similar to transparency module 2110, in accordance with one or more implementations.

At step 2210, a visual representation may be displayed without transparency and an associated content portion may be highlighted responsive to mouse hover. Step 2210 may be performed by a mouse hover module that is the same as or similar to mouse hover module 2112, in accordance with one or more implementations.

At step 2212, visibility of content outside the visual representation without transparency may be reduced. Step 2212 may be performed by a mouse hover module that is the same as or similar to mouse hover module 2112, in accordance with one or more implementations.

At step 2214, an add to cart selector associated with the visual representation displayed without transparency may be displayed, responsive to user selection. Step 2214 may be performed by a mouse hover module that is the same as or similar to mouse hover module 2112, in accordance with one or more implementations.

Figure 23:
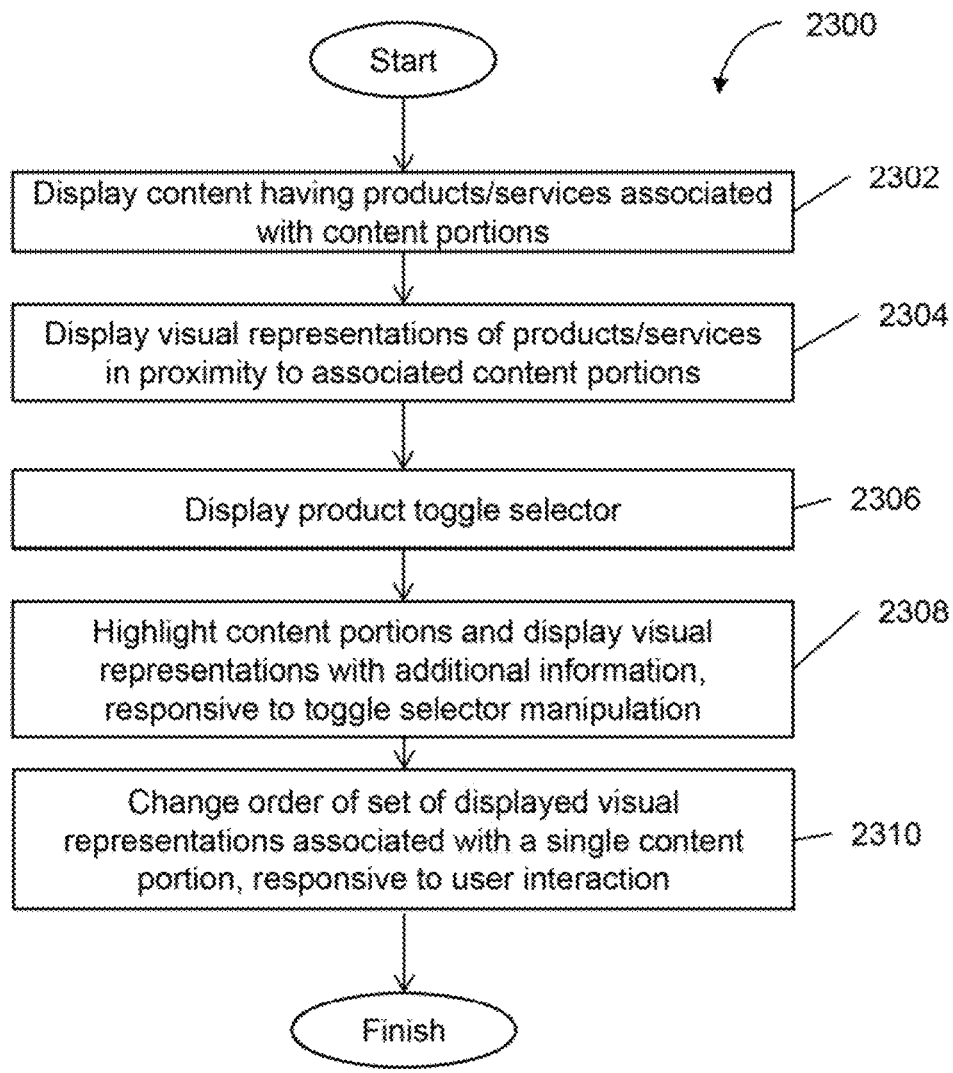
FIG. 23 is a method for managing and interacting with content/product fusions, in an embodiment.

FIG. 23 depicts an embodiment of a method 2300 for managing and interacting with content/product fusions. One skilled in the art will appreciate that the following method is presented as an exemplary non-limiting embodiment, where in other embodiments steps may be performed in various orders, combined, omitted, and/or additional steps may be included.

In some embodiments, method 2300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 2300 in response to instructions stored electronically on an electronic storage medium. The one or more processing devices may include one or more devices configured through hardware, firmware, and/or software to be specifically designed for execution of one or more of the operations of method 2300.

At step 2302, content having products/services associated with content portions may be displayed. Step 2302 may be performed by a content display module that is the same as or similar to content display module 2108, in accordance with one or more implementations.

At step 2304, visual representations of products/services may be displayed in proximity to associated content portions. Step 2304 may be performed by a content display module that is the same as or similar to content display module 2108, in accordance with one or more implementations.

At step 2306, a product toggle selector may be displayed. Step 2306 may be performed by a content display module that is the same as or similar to content display module 2108, and/or by a product toggle module that is the same as or similar to product toggle module 2116, in accordance with one or more implementations.

At step 2308, content portions may be highlighted and visual representations displayed with additional information, responsive to toggle selector manipulation. Step 2308 may be performed by a product toggle module that is the same as or similar to product toggle module 2116, in accordance with one or more implementations.

At step 2310, the order of a set of displayed visual representations associated with a single content portion may be changed, responsive to user interaction. Step 2310 may be performed by a product toggle module that is the same as or similar to product toggle module 2116, in accordance with one or more implementations.

Figure 24:
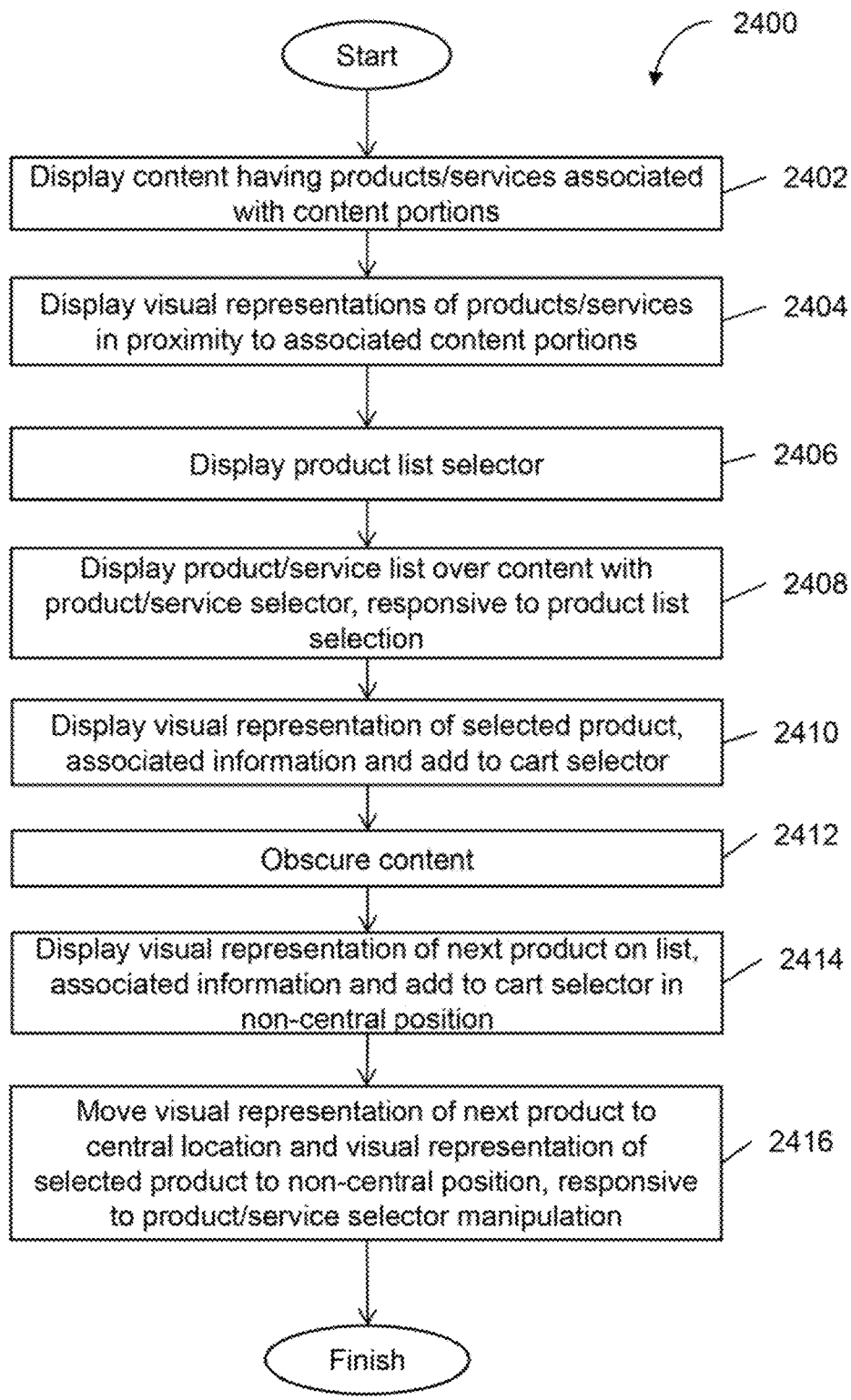
FIG. 24 is a method for managing and interacting with content/product fusions, in an embodiment.

FIG. 24 depicts an embodiment of a method 2400 for managing and interacting with content/product fusions. One skilled in the art will appreciate that the following method is presented as an exemplary non-limiting embodiment, where in other embodiments steps may be performed in various orders, combined, omitted, and/or additional steps may be included.

In some embodiments, method 2400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 2400 in response to instructions stored electronically on an electronic storage medium. The one or more processing devices may include one or more devices configured through hardware, firmware, and/or software to be specifically designed for execution of one or more of the operations of method 2200.

At step 2402, content having products/services associated with content portions may be displayed. Step 2402 may be performed by a content display module that is the same as or similar to content display module 2108, in accordance with one or more implementations.

At step 2404, visual representations of products/services may be displayed in proximity to associated content portions. Step 2404 may be performed by a content display module that is the same as or similar to content display module 2108, in accordance with one or more implementations.

At step 2406, a product list selector may be displayed. Step 2406 may be performed by a product list module that is the same as or similar to product list module 2118, and/or by a content display module that is the same as or similar to content display module 2108, in accordance with one or more implementations.

At step 2408, a product/service list may be displayed over content with a product/service selector, responsive to product list selection. Step 2408 may be performed by a product list module that is the same as or similar to product list module 2118, in accordance with one or more implementations.

At step 2410, a visual representation of a selected product may be displayed, associated information and add to cart selector. Step 2410 may be performed by a product list module that is the same as or similar to product list module 2118, in accordance with one or more implementations.

At step 2412, content may be obscured. Step 2412 may be performed by a product list module that is the same as or similar to product list module 2118, in accordance with one or more implementations.

At step 2414, a visual representation of the next product on the list, associated information and an add to cart selector may be displayed in a non-central position. Step 2414 may be performed by a product list module that is the same as or similar to product list module 2118, in accordance with one or more implementations.

At step 2416, the visual representation of the next product may be moved to a central location and the visual representation of the selected product may be moved to a non-central position, responsive to product/service selector manipulation. Step 2416 may be performed by a product list module that is the same as or similar to product list module 2118, in accordance with one or more implementations.

Figure 25:
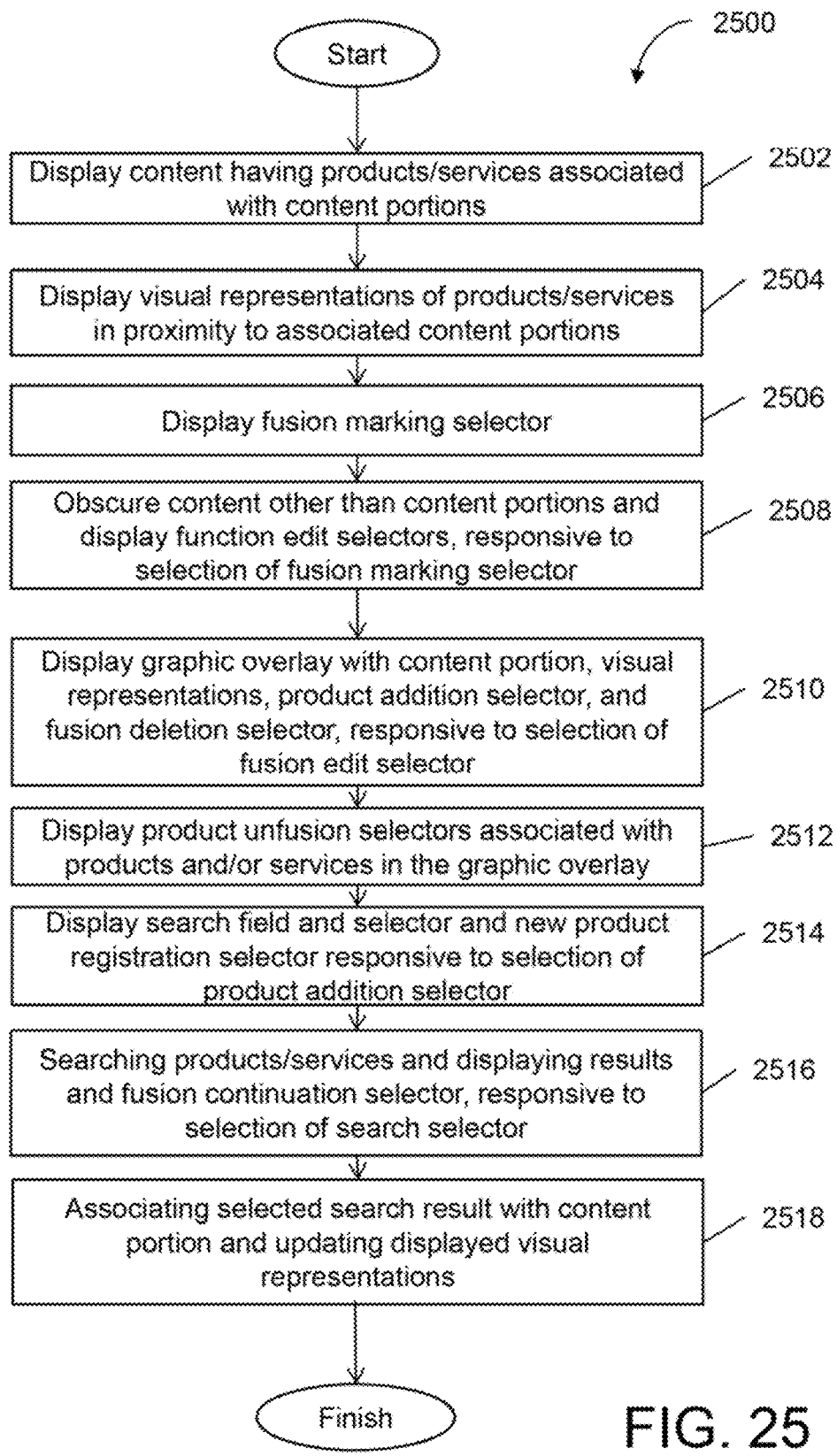
FIG. 25 is a method for managing and interacting with content/product fusions, in an embodiment.

FIG. 25 depicts an embodiment of a method 2500 for managing and interacting with content/product fusions. One skilled in the art will appreciate that the following method is presented as an exemplary non-limiting embodiment, where in other embodiments steps may be performed in various orders, combined, omitted, and/or additional steps may be included.

In some embodiments, method 2500 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 2500 in response to instructions stored electronically on an electronic storage medium. The one or more processing devices may include one or more devices configured through hardware, firmware, and/or software to be specifically designed for execution of one or more of the operations of method 2500.

At step 2502, content having products/services associated with content portions may be displayed. Step 2502 may be performed by a content display module that is the same as or similar to content display module 2108, in accordance with one or more implementations.

At step 2504, visual representations of products/services may be displayed in proximity to associated content portions. Step 2504 may be performed by a content display module that is the same as or similar to content display module 2108, in accordance with one or more implementations.

At step 2506, a fusion marking selector may be displayed. Step 2506 may be performed by a content display module that is the same as or similar to content display module 2108, and/or by fusion marking module that is the same as or similar to fusion marking module 2120, in accordance with one or more implementations.

At step 2508, content other than content portions may be obscured and function edit selectors may be displayed, responsive to selection of the fusion marking selector. Step 2508 may be performed by a fusion edit module that is the same as or similar to fusion edit module 2122, in accordance with one or more implementations.

At step 2510, a graphic overlay may be displayed with a content portion, visual representations, product addition selector, and fusion deletion selector, responsive to selection of the fusion edit selector. Step 2510 may be performed by a fusion edit module that is the same as or similar to fusion edit module 2122, in accordance with one or more implementations.

At step 2512, product unfusion selectors associated with products and/or services in the graphic overlay may be displayed. Step 2512 may be performed by a fusion edit module that is the same as or similar to fusion edit module 2122, in accordance with one or more implementations.

At step 2514, a search field and selector and new product registration selector may be displayed responsive to selection of the product addition selector. Step 2514 may be performed by a product addition module that is the same as or similar to product addition module 2125, in accordance with one or more implementations.

At step 2516, products/services may be searched and results and a fusion continuation selector may be displayed, responsive to selection of the search selector. Step 2516 may be performed by a product addition module that is the same as or similar to product addition module 2125, in accordance with one or more implementations.

At step 2518, a selected search result may be associated with the content portion and displayed visual representations may be updated accordingly. Step 2518 may be performed by a product addition module that is the same as or similar to product addition module 2125, in accordance with one or more implementations.

Figure 26:
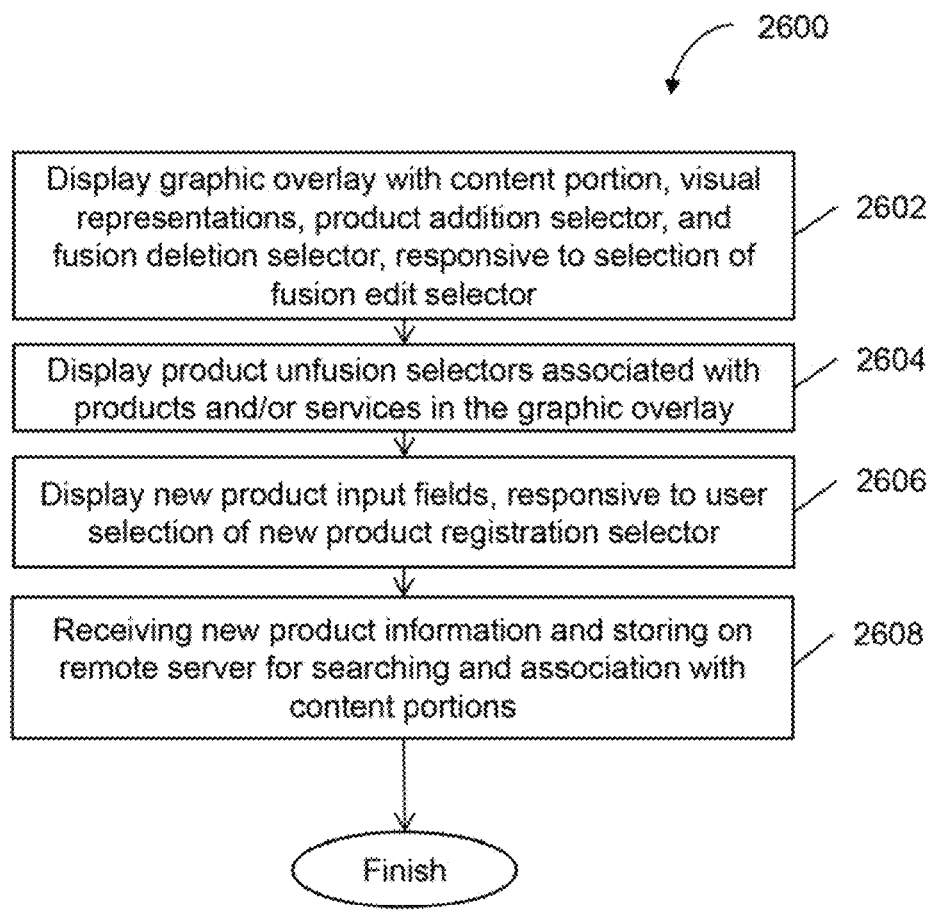
FIG. 26 is a method for managing and interacting with content/product fusions, in an embodiment.

FIG. 26 depicts an embodiment of a method 2600 for managing and interacting with content/product fusions. One skilled in the art will appreciate that the following method is presented as an exemplary non-limiting embodiment, where in other embodiments steps may be performed in various orders, combined, omitted, and/or additional steps may be included.

In some embodiments, method 2600 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 2600 in response to instructions stored electronically on an electronic storage medium. The one or more processing devices may include one or more devices configured through hardware, firmware, and/or software to be specifically designed for execution of one or more of the operations of method 2600.

At step 2602, a graphic overlay with content portion, visual representations, product addition selector, and fusion deletion selector may be displayed, responsive to selection of a fusion edit selector. Step 2602 may be performed by a fusion edit module that is the same as or similar to fusion edit module 2122, in accordance with one or more implementations.

At step 2604, product unfusion selectors may be displayed associated with products and/or services in the graphic overlay. Step 2604 may be performed by a fusion edit module that is the same as or similar to fusion edit module 2122, in accordance with one or more implementations.

At step 2606, new product input fields may be displayed, responsive to user selection of the new product registration selector. Step 2606 may be performed by a new product registration module that is the same as or similar to new product registration module 2124, in accordance with one or more implementations.

At step 2608, new product information may be received and stored on the remote server for searching and association with content portions. Step 2608 may be performed by a new product registration module that is the same as or similar to new product registration module 2124, in accordance with one or more implementations.

Figure 27:
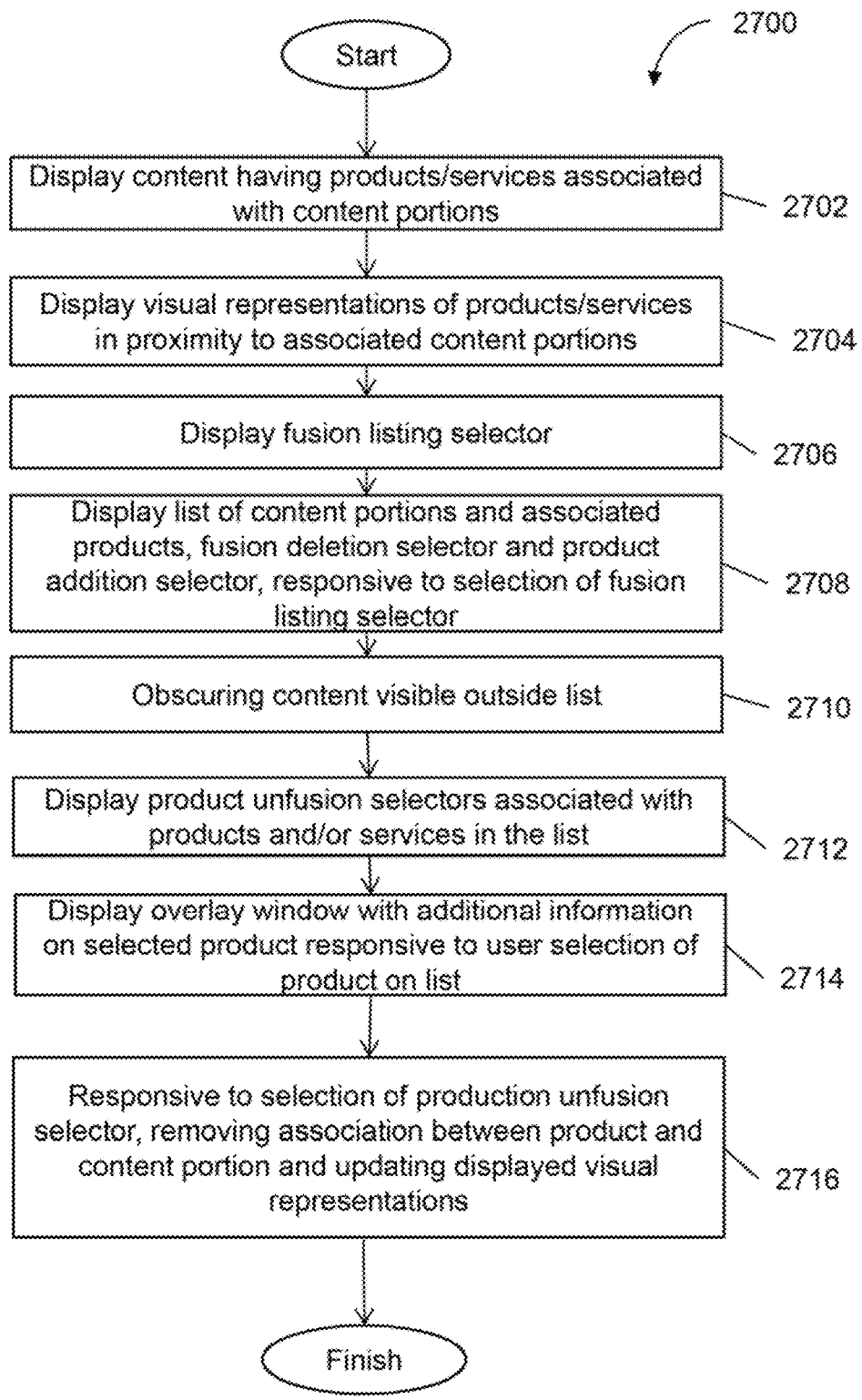
FIG. 27 is a method for managing and interacting with content/product fusions, in an embodiment.

FIG. 27 depicts an embodiment of a method 2700 for managing and interacting with content/product fusions. One skilled in the art will appreciate that the following method is presented as an exemplary non-limiting embodiment, where in other embodiments steps may be performed in various orders, combined, omitted, and/or additional steps may be included.

In some embodiments, method 2700 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 2700 in response to instructions stored electronically on an electronic storage medium. The one or more processing devices may include one or more devices configured through hardware, firmware, and/or software to be specifically designed for execution of one or more of the operations of method 2700.

At step 2702, content having products/services associated with content portions may be displayed. Step 2702 may be performed by a content display module that is the same as or similar to content display module 2108, in accordance with one or more implementations.

At step 2704, visual representations of products/services may be displayed in proximity to associated content portions. Step 2704 may be performed by a content display module that is the same as or similar to content display module 2108, in accordance with one or more implementations.

At step 2706, a fusion listing selector may be displayed. Step 2706 may be performed by a content display module that is the same as or similar to content display module 2108, and/or by a fusion listing module that is the same as or similar to fusion listing module 2123, in accordance with one or more implementations.

At step 2708, a list of content portions and associated products, a fusion deletion selector and a product addition selector, may be displayed responsive to selection of the fusion listing selector. Step 2708 may be performed by a fusion listing module that is the same as or similar to fusion listing module 2123, in accordance with one or more implementations.

At step 2710, content visible outside list may be obscured. Step 2710 may be performed by a fusion listing module that is the same as or similar to fusion listing module 2123, in accordance with one or more implementations.

At step 2712, product unfusion selectors associated with products and/or services in the list may be displayed. Step 2712 may be performed by a fusion listing module that is the same as or similar to fusion listing module 2123, and/or by an unfusion module that is the same as or similar to unfusion module 2127, in accordance with one or more implementations.

At step 2714, an overlay window with additional information on a selected product responsive to user selection of the product on the list may be displayed. Step 2714 may be performed by a fusion listing module that is the same as or similar to fusion listing module 2123, in accordance with one or more implementations.

At step 2714, responsive to selection of the production unfusion selector, an association between the product and content portion may be removed and the displayed visual representations may be updated accordingly. Step 2714 may be performed by an unfusion module that is the same as or similar to unfusion module 2127, in accordance with one or more implementations.

Figure 28:
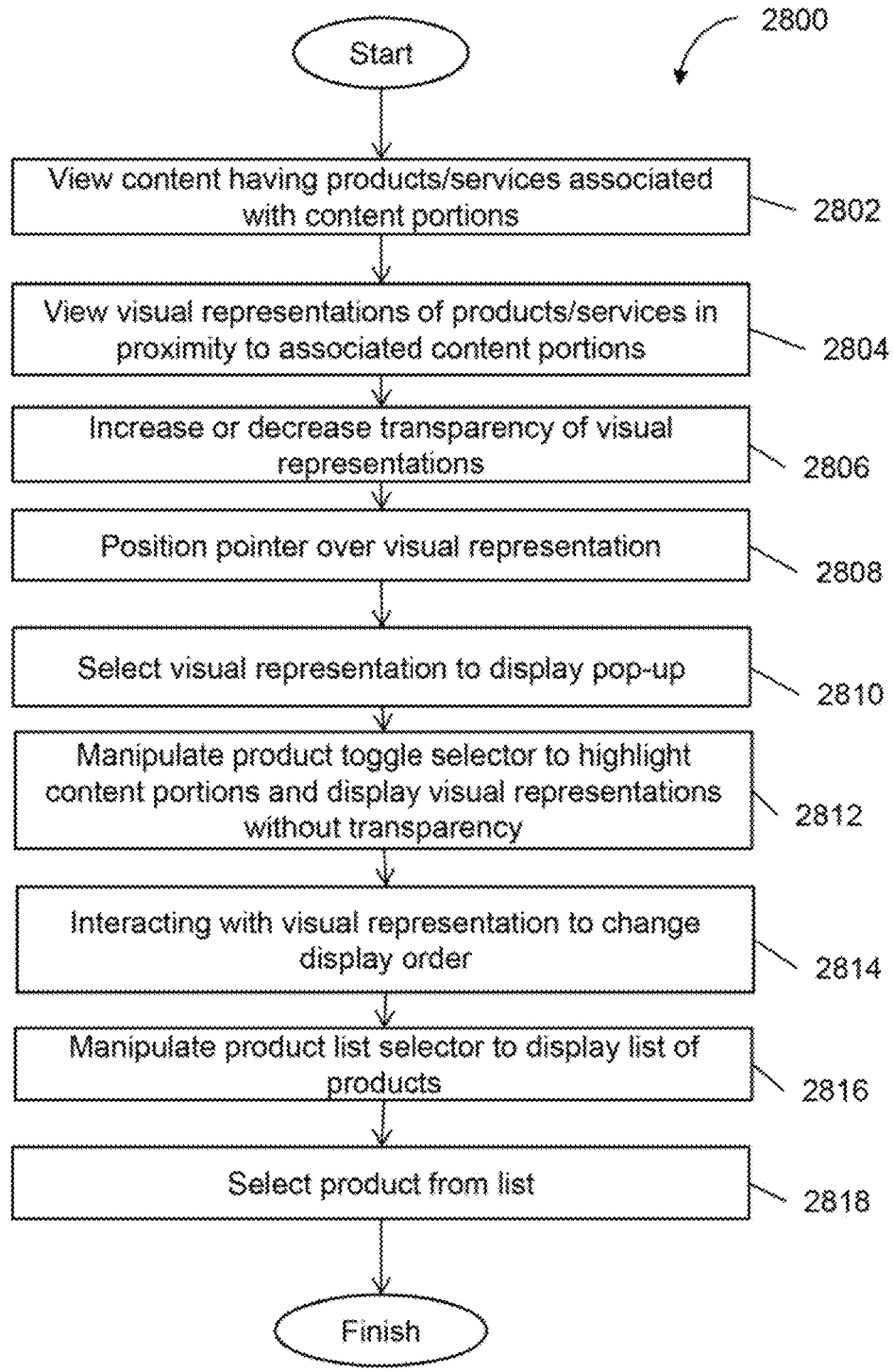
FIG. 28 is a method for managing and interacting with content/product fusions, in an embodiment.

FIG. 28 depicts an embodiment of a method 2800 for managing and interacting with content/product fusions. One skilled in the art will appreciate that the following method is presented as an exemplary non-limiting embodiment, where in other embodiments steps may be performed in various orders, combined, omitted, and/or additional steps may be included.

In some embodiments, method 2800 may be implemented using one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 2800 in response to instructions stored electronically on an electronic storage medium. The one or more processing devices may include one or more devices configured through hardware, firmware, and/or software to be specifically designed for execution of one or more of the operations of method 2800.

At step 2802, content having products/services associated with content portions may be viewed. At step 2804, visual representations of products/services may be viewed in proximity to associated content portions.

At step 2806, transparency of visual representations may be Increased or decreased. Step 2806 may be performed using a content display module that is the same as or similar to content display module 2108, and/or by a fusion listing module that is the same as or similar to fusion listing module 2123, in accordance with one or more implementations.

At step 2808, a pointer may be positioned over a visual representation. Step 2808 may be performed using a user input and client-side operating system and/or content display module, in accordance with one or more implementations.

At step 2810, a visual representation may be selected to display a pop-up. Step 2810 may be performed using a mouse hover module that is the same as or similar to mouse hover module 2112, in accordance with one or more implementations.

At step 2812, a product toggle selector may be manipulated to highlight content portions and display visual representations without transparency. Step 2812 may be performed using a product toggle module that is the same as or similar to product toggle module 2116, in accordance with one or more implementations.

At step 2814, visual representations may be interacted with to change their display order. Step 2814 may be performed using a content display module that is the same as or similar to content display module 2108, in accordance with one or more implementations.

At step 2816, a product list selector may be manipulated to display list of products. Step 2816 may be performed using a product list module that is the same as or similar to product list module 2118, in accordance with one or more implementations.

At step 2818, a product may be selected from the list. Step 2818 may be performed using a product list module that is the same as or similar to product list module 2118, in accordance with one or more implementations.

Figure 29:
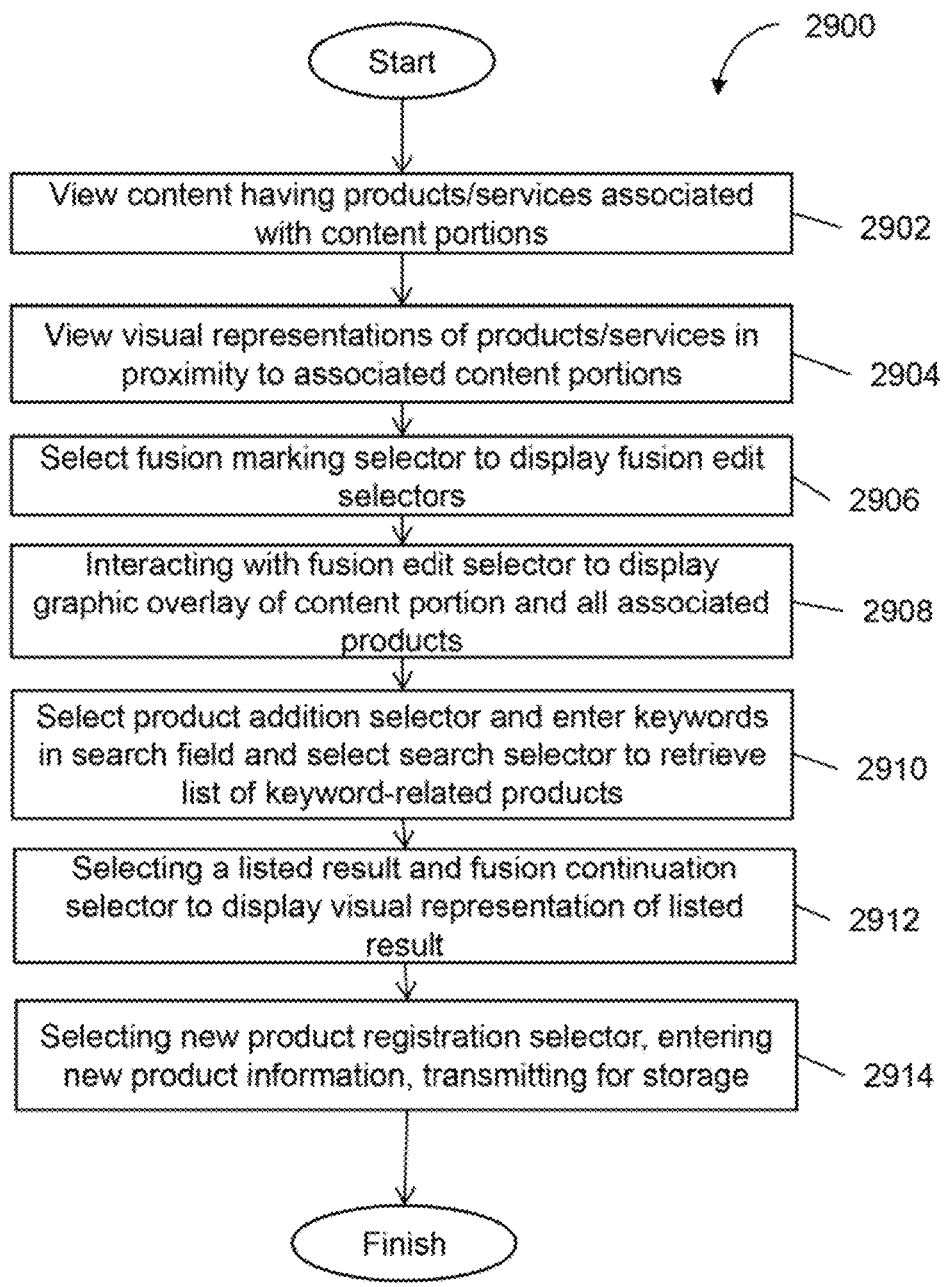
FIG. 29 is a method for managing and interacting with content/product fusions, in an embodiment.

FIG. 29 depicts an embodiment of a method 2900 for managing and interacting with content/product fusions. One skilled in the art will appreciate that the following method is presented as an exemplary non-limiting embodiment, where in other embodiments steps may be performed in various orders, combined, omitted, and/or additional steps may be included.

In some embodiments, method 2900 may be implemented using one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 2900 in response to instructions stored electronically on an electronic storage medium. The one or more processing devices may include one or more devices configured through hardware, firmware, and/or software to be specifically designed for execution of one or more of the operations of method 2900.

At step 2902, content having products/services associated with content portions may be viewed. At step 2904, visual representations of products/services may be viewed in proximity to associated content portions.

At step 2906, a fusion marking selector may be selected to display fusion edit selectors. Step 2906 may be performed using a fusion marking module that is the same as or similar to fusion marking module 2120, in accordance with one or more implementations.

At step 2908, a fusion edit selector may be interacted with to display a graphic overlay of a content portion and all associated products. Step 2908 may be performed using a fusion edit module that is the same as or similar to fusion edit module 2122, in accordance with one or more implementations.

At step 2910, a product addition selector may be selected and keywords may be entered in a search field and a search selector may be selected to retrieve a list of keyword-related products. Step 2910 may be performed using a product addition module that is the same as or similar to product addition module 2125, in accordance with one or more implementations.

At step 2912, a listed result and fusion continuation selector may be selected to display visual representation of listed result. Step 2912 may be performed using a product addition module that is the same as or similar to fusion product addition 2125, in accordance with one or more implementations.

At step 2914, a new product registration selector may be selected and new product information may be entered and transmitted for storage. Step 2914 may be performed using a new product registration module that is the same as or similar to new product registration module 2124, in accordance with one or more implementations.

Figure 30:
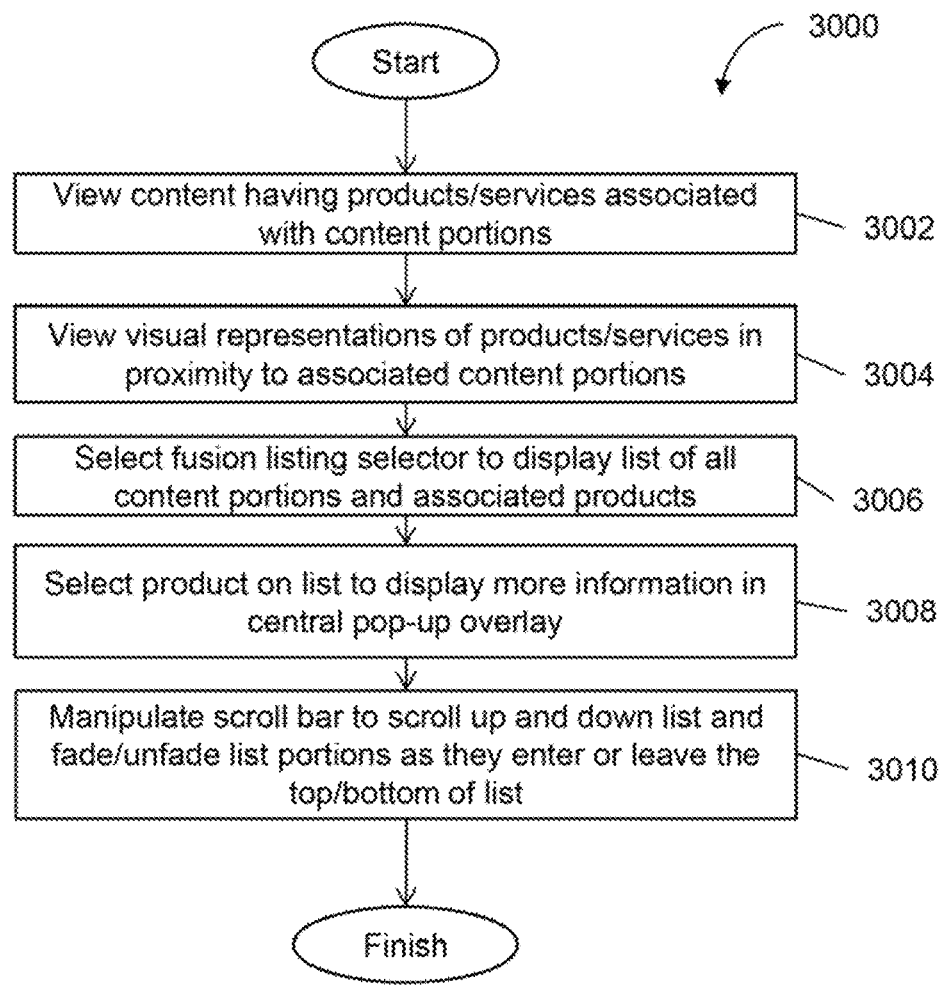
FIG. 30 is a method for managing and interacting with content/product fusions, in an embodiment.

FIG. 30 depicts an embodiment of a method 3000 for managing and interacting with content/product fusions. One skilled in the art will appreciate that the following method is presented as an exemplary non-limiting embodiment, where in other embodiments steps may be performed in various orders, combined, omitted, and/or additional steps may be included.

In some embodiments, method 3000 may be implemented using one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 3000 in response to instructions stored electronically on an electronic storage medium. The one or more processing devices may include one or more devices configured through hardware, firmware, and/or software to be specifically designed for execution of one or more of the operations of method 3000.

At step 3002, content having products/services associated with content portions may be viewed. At step 3004, visual representations of products/services may be viewed in proximity to associated content portions.

At step 3006, a fusion listing selector may be selected to display a list of content portions and associated products, a fusion deletion selector and a product addition selector. Step 3006 may be performed using a content display module that is the same as or similar to content display module 2108, and/or by a fusion listing module that is the same as or similar to fusion listing module 2123, in accordance with one or more implementations.

At step 3008, a product on the list may be selected to display more information in a central pop-up overlay, responsive to selection of the fusion listing selector. Step 3008 may be performed using a fusion listing module that is the same as or similar to fusion listing module 2123, in accordance with one or more implementations.

At step 3010, a scroll bar may be manipulated to scroll up and down list and fade/unfade list portions as they enter or leave the top/bottom of list. Step 3010 may be performed using a fusion listing module that is the same as or similar to fusion listing module 2123, in accordance with one or more implementations.

In the foregoing specification, embodiments have been described with reference to specific embodiments. However, one of ordinary skill in the art appreciates that various modifications and changes can be made without departing from the scope of the invention. The invention encompasses every possible combination of the various features of each embodiment disclosed. One or more of the elements described herein with respect to various embodiments can be implemented in a more separated or integrated manner than explicitly described, or even removed or rendered as inoperable in certain cases, as is useful in accordance with a particular application. Accordingly, the specification and figures are to be regarded in an illustrative rather than a restrictive sense, and all such modifications are intended to be included within the scope of invention.

Although the invention has been described with respect to specific embodiments thereof, these embodiments are merely illustrative, and not restrictive of the invention. The description herein of illustrated embodiments of the invention is not intended to be exhaustive or to limit the invention to the precise forms disclosed herein (and in particular, the inclusion of any particular embodiment, feature or function is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment," "an embodiment," or "a specific embodiment" or similar terminology means that a particular feature, structure, or characteristic described in connection with the embodiment is included in at least one embodiment and may not necessarily be present in all embodiments. Thus, respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Any suitable programming language can be used to implement the routines, methods or programs of embodiments of the invention described herein, including C, C++, Java, Python, assembly language, etc. Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nano-engineered systems, components and mechanisms may be used. In general, the functions of the invention can be achieved by any means as is known in the art. For example, distributed or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example, only but not by limitation, an electronic, magnetic, optical, electromagnetic, infrared, or semiconductor system, apparatus, system, device, propagation medium, or computer memory.

Such computer-readable medium shall generally be machine readable and include software programming or code that can be human readable (e.g., source code) or machine readable (e.g., object code).

A "processor" includes any, hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

Furthermore, the term "or" as used herein is generally intended to mean "and/or" unless otherwise indicated. As used herein, a term preceded by "a" or "an" (and "the" when antecedent basis is "a" or "an") includes both singular and plural of such term (i.e., that the reference "a" or "an" clearly indicates only the singular or only the plural). Also, as used in the description herein, the meaning of "in" includes "in" and "on" unless the context clearly dictates otherwise.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

The invention claimed is:

1. A graphic user interface method for improved user viewing and manipulation of advanced interactive web-based content, comprising:
   responsive to a user request to a remote network server, transmitting over a computer network and displaying on a computing device display non-catalog web content comprising a fused content, the fused content comprising at least one of text and a graphic associated with a purchasable item, the purchasable item comprising at least one of a product and service;
   automatically transmitting over the computer network and displaying on the computing device display a visual representation of the purchasable item overlapping with the fused content with a non-zero level of transparency so as to be superimposed over at least part of the fused content;
   initiating a transparency selector configured to increase or decrease a transparency of the displayed visual representation of the purchasable item responsive to user manipulation of the transparency selector via a user input, the transparency selector comprising a transparency selector visual representation;
   displaying on the computing device display, at the same time as the visual representation of the purchasable item, the transparency selector visual representation;
   increasing or decreasing the transparency of the displayed visual representation of the purchasable item responsive to user manipulation of the transparency selector via the user input and transparency selector visual representation;
   displaying additional information relating to the purchasable item in response to a user interaction with at least one of the visual representation of the purchasable item and the fused content, the additional information relating to the purchasable item comprising at least one of a name and a price; and
   displaying an Add to Cart selector comprising an Add to Cart selector visual representation; and
   placing the purchasable item in a virtual shopping cart when the Add to Cart selector visual representation is selected, without the user having to leave the non-catalog web content.

2. The method of claim 1, wherein the the purchasable item comprises a product, and wherein the visual representation of the purchasable item comprises a picture of the product.

3. The method of claim 1, wherein the transparency selector visual representation comprises:
   a slider control,
   a low transparency indicator on a first end of the slider control;
   a high transparency indicator on a second end of the slider control opposite the first end; and
   a thumb configured to be slid along the slider control by user manipulation,
   wherein the transparency selector is further configured to reduce transparency of the displayed visual representation of the purchasable item when the user slides the thumb on the slider control towards the low transparency indicator and to increase transparency of the displayed visual representation of the purchasable item when the user slides the thumb on the slider control towards the high transparency.

4. The method of claim 1, further comprising storing an object on the remote network server, the stored objecting associating the fused content with the purchasable item.

5. The method of claim 1, wherein the user interaction comprises positioning a pointer over at least one of the visual representation of the purchasable item and the fused content.

6. The method of claim 1, wherein the additional information comprises the name and the price.

7. The method of claim 1, further comprising reducing visibility of an element of the non-catalog web content other than fused content.

8. The method of claim 1, wherein the Add to Cart selector is displayed in response to the user interaction with at least one of the visual representation of the purchasable item and fused content.

9. The method of claim 8, further comprising displaying a pop-up on top of the non-catalog web content; and
   reducing visibility of a portion of the non-catalog web content adjacent to the pop-up,
   wherein the Add to Cart selector and additional information relating to purchasable item are displayed in the pop up.

10. The method of claim 9, wherein reducing visibility of the portion of the non-catalog web content adjacent to the pop-up comprises reducing contrast of the non-catalog web content adjacent to the pop-up.

11. The method of claim 1, further comprising:
   initiating a product toggle selector comprising a product toggle selector visual representation;

displaying the product toggle selector visual representation responsive to user manipulation of the product toggle selector visual representation, highlighting the fused content, displaying the visual representations of the purchasable item with a zero value of transparency without obscuring the fused content, and displaying the additional information relating to the purchasable item without obscuring the fused content.

12. The method of claim 11,
wherein the purchasable item associated with the fused content is a first purchasable item,
wherein a second purchasable item is associated with the fused content,
wherein displaying the visual representation of the purchasable item with a non-zero value of transparency comprises displaying a visual representation of the first purchasable item and displaying a visual representation of the second purchasable item in an overlapping fashion, such that the visual representation of the second purchasable item is partially obscured.

13. The method of claim 12, wherein displaying the visual representation of the purchasable item further comprises displaying the visual representation of the first purchasable item larger than the first of the visual representations of the second purchasable item, creating the appearance that the visual representation of the second purchasable item is some distance behind the visual representation of the first purchasable item.

14. The method of claim 12, further comprising, responsive to a user interaction with one of the visual representation of the first purchasable item and the visual representation of the second purchasable item, displaying the visual representation of the first purchasable item partially obscured by the visual representation of the second purchasable item.

15. The method of claim 14, further comprising responsive to the user interaction with one of the visual representation of the first purchasable item and the visual representation of the second purchasable item displaying an animation showing the visual representation of the first purchasable item moving out of fully visible position and into an obscured position while the visual representation of the second purchasable item moves out of the obscured position and into the fully visible position.

16. The method of claim 1, further comprising:
initiating a product list selector, the product list selector comprising a product list selector visual representation;
displaying the product list selector visual representation;
responsive to a user manipulation of the product list selector visual representation, displaying over the non-catalog web content a list of purchasable items, the list of purchasable items comprising the purchasable item associated with the fused content;
responsive to the user manipulation of the product list selector visual representation displaying a purchasable item selector configured to select one of the purchasable item associated with the fused content;
responsive to a user selection of the purchasable item associated with the fused content, displaying a second visual representation of the purchasable item associated with the fused content, a price, and a product list Add to Cart selector; and
responsive to a user selection of the product list Add to Cart selector, placing the purchasable associated item in the virtual shopping cart, without the user having to leave the non-catalog web content.

17. The method of claim 16, wherein the purchasable item selector comprises:
a slide next to the list of purchasable items, and
a current product indicator,
wherein the purchasable item selector is configured to move the current product indicator along the slide responsive to a user manipulation, and
wherein the user selection of the purchasable item associated with the fused content comprises movement of the guide.

18. The method of claim 1, wherein the virtual shopping is stored on the remote network server.

19. A graphical user interface method for improved user viewing and manipulation of advanced interactive web-based content, comprising:
responsive to a user request to a remote network server, transmitting over a computer network and displaying on a computing device display non-catalog web content, the non-catalog web content comprising:
a fused content associated a purchasable item, the purchasable item comprising one of a product and a service;
a nonassociated content not associated the purchasable item;
displaying a product toggle selector together with the non-catalog web content;
responsive to a user manipulation of the product toggle selector, highlighting the fused content and displaying over the non-catalog web content additional information relating to the purchasable item associated with the fused content;
displaying an Add to Cart selector; and
placing the purchasable item associated with the fused content in a virtual shopping cart when the Add to Cart selector is selected, without the user having to leave the non-catalog web content.

20. A graphic user interface method for improved user viewing and manipulation of advanced interactive web-based content, comprising:
responsive to a user request to a remote network server, transmitting over a computer network and displaying on a computing device display non-catalog web content comprising fused content associated with a purchasable item, the purchasable item comprising one of a product and a service;
displaying a product list selector; and
responsive to user manipulation of the product list selector, displaying over the non-catalog web content a list, the list comprising the purchasable item associated with the fused content;
responsive to the user manipulation of the product list selector, displaying a purchasable item selector configured to select the purchasable item associated with the fused content;
responsive to a user selection of the purchasable item, displaying a visual representation of the purchasable item associated with the fused content along with associated information and an Add to Cart selector; and
placing the purchasable item associated with the fused content in a virtual shopping cart when the Add to Cart selector is selected, without the user having to leave the non-catalog web content.

* * * * *